US012637043B2

(12) United States Patent (10) Patent No.: US 12,637,043 B2
Kirmaier et al. (45) Date of Patent: May 26, 2026

(54) TRAILER BRAKE CONTROL SYSTEM

(71) Applicant: AGCO International GmbH, Neuhausen (CH)

(72) Inventors: Philipp Kirmaier, Marktoberdorf (DE); Josef Ammann, Marktoberdorf (DE); Bernhard Höldrich, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 284 days.

(21) Appl. No.: 18/258,607

(22) PCT Filed: Dec. 3, 2021

(86) PCT No.: PCT/IB2021/061301
§ 371 (c)(1),
(2) Date: Jun. 21, 2023

(87) PCT Pub. No.: WO2022/157572
PCT Pub. Date: Jul. 28, 2022

(65) Prior Publication Data
US 2024/0270217 A1 Aug. 15, 2024

(30) Foreign Application Priority Data

Jan. 19, 2021 (GB) ..................................... 2100651
Aug. 9, 2021 (GB) ..................................... 2111426

(51) Int. Cl.
*B60T 8/17* (2006.01)
*B60Q 9/00* (2006.01)
(Continued)

(52) U.S. Cl.
CPC .............. *B60T 8/1708* (2013.01); *B60Q 9/00* (2013.01); *B60T 7/20* (2013.01); *B60T 8/1701* (2013.01);
(Continued)

(58) Field of Classification Search
None
See application file for complete search history.

(56) References Cited

U.S. PATENT DOCUMENTS 5,149,121 A 9/1992 Hafner
5,522,649 A * 6/1996 Stender ................... B60T 17/22
303/7
(Continued)

FOREIGN PATENT DOCUMENTS

CN 116745183 A * 9/2023
DE 102012101501 A1 8/2013
(Continued)

OTHER PUBLICATIONS

European Patent Office, International Search Report related to International Patent Application No. PCT/IB2021/061301, mail date Mar. 4, 2022, 13 pages.

*Primary Examiner* — Kevin R Steckbauer

(57) ABSTRACT

Systems and methods are provided for controlling operation of a trailer brake system associated with an agricultural vehicle-trailer combination, including: determining a trailer brake temperature; comparing the determined trailer brake temperature with one or more temperature thresholds to determine a temperature level condition for the trailer brake; and controlling the trailer brake system in dependence on the determined temperature level condition.

14 Claims, 15 Drawing Sheets

(51) Int. Cl.

| | |
|---|---|
| *B60T 7/20* | (2006.01) |
| *B60T 8/171* | (2006.01) |
| *B60T 8/172* | (2006.01) |
| *B60T 8/1755* | (2006.01) |
| *B60T 8/18* | (2006.01) |
| *B60T 8/24* | (2006.01) |
| *B60T 8/32* | (2006.01) |
| *B60T 13/12* | (2006.01) |
| *B60T 13/26* | (2006.01) |
| *B60T 13/66* | (2006.01) |
| *B60T 13/68* | (2006.01) |
| *B60T 17/22* | (2006.01) |

(52) U.S. Cl.

CPC .............. *B60T 8/171* (2013.01); *B60T 8/172* (2013.01); *B60T 8/1755* (2013.01); *B60T 8/17551* (2013.01); *B60T 8/18* (2013.01); *B60T 8/245* (2013.01); *B60T 8/248* (2013.01); *B60T 8/323* (2013.01); *B60T 13/12* (2013.01); *B60T 13/26* (2013.01); *B60T 13/263* (2013.01); *B60T 13/66* (2013.01); *B60T 13/662* (2013.01); *B60T 13/68* (2013.01); *B60T 17/22* (2013.01); *B60T 2201/04* (2013.01); *B60T 2210/30* (2013.01); *B60T 2250/00* (2013.01); *B60T 2250/02* (2013.01); *B60T 2250/03* (2013.01); *B60Y 2200/147* (2013.01); *B60Y 2200/22* (2013.01); *B60Y 2200/221* (2013.01)

(56) References Cited

U.S. PATENT DOCUMENTS

| | | | | |
|---|---|---|---|---|
| 5,615,931 A | | 4/1997 | Stumpe et al. | |
| 5,738,418 A | * | 4/1998 | Stumpe ................. | B60T 13/683 |
| | | | | 303/15 |
| 6,934,618 B2 | * | 8/2005 | Eckert .................... | B60T 8/885 |
| | | | | 701/19 |
| 8,897,985 B2 | * | 11/2014 | Eckert ................... | B60T 8/1708 |
| | | | | 701/70 |
| 9,718,449 B2 | * | 8/2017 | Newberry ................. | B60L 7/12 |
| 10,549,742 B2 | | 2/2020 | Boulivan | |
| 10,767,717 B2 | * | 9/2020 | Cremona ............. | B60T 8/1708 |
| 11,261,930 B2 | * | 3/2022 | Cremona ................ | B60T 17/22 |
| 11,932,225 B1 | * | 3/2024 | Kirmaier ............. | B60T 13/662 |
| 2004/0015283 A1 | * | 1/2004 | Eckert ....................... | B60T 8/00 |
| | | | | 701/70 |
| 2004/0041464 A1 | * | 3/2004 | Eckert ................... | B60T 8/1708 |
| | | | | 303/7 |
| 2004/0051374 A1 | | 3/2004 | Tobler | |
| 2014/0180553 A1 | * | 6/2014 | Eckert ................... | B60T 8/885 |
| | | | | 701/70 |
| 2018/0037210 A1 | * | 2/2018 | Hecker .................. | B60T 17/22 |
| 2020/0001841 A1 | | 1/2020 | Green et al. | |
| 2020/0040956 A1 | * | 2/2020 | Cremona ............. | F16D 66/027 |
| 2020/0362931 A1 | * | 11/2020 | Cremona ................ | B60T 8/885 |
| 2022/0355772 A1 | * | 11/2022 | Matschke ............ | B60T 8/1766 |
| 2023/0234548 A1 | * | 7/2023 | Suh ....................... | B60T 17/226 |
| | | | | 701/29.3 |
| 2024/0042976 A1 | * | 2/2024 | Kirmaier ................ | B60T 13/08 |
| 2024/0092324 A1 | * | 3/2024 | Kirmaier ............ | B60T 8/17551 |
| 2024/0101082 A1 | * | 3/2024 | Yilmaz .................. | B60T 17/22 |
| 2024/0270217 A1 | * | 8/2024 | Kirmaier ............. | B60T 13/662 |
| 2025/0074384 A1 | * | 3/2025 | Kirmaier ............. | B60T 8/1708 |

FOREIGN PATENT DOCUMENTS

| | | | | | |
|---|---|---|---|---|---|
| DE | 102018121439 A1 | | 3/2020 | | |
| EP | 1359077 A1 | * | 11/2003 | ........... | B60T 8/1708 |
| EP | 1433681 A1 | * | 6/2004 | ........... | B60T 8/1708 |
| EP | 2123528 A2 | * | 11/2009 | ........... | B60T 8/1708 |
| EP | 3569458 A1 | | 11/2019 | | |
| EP | 4342750 A1 | * | 3/2024 | ........... | B60T 8/1708 |
| EP | 4281343 B1 | * | 11/2024 | ............. | B60T 8/323 |
| EP | 4281342 B1 | * | 2/2025 | ............. | B60T 8/323 |
| EP | 4516603 A1 | * | 3/2025 | ............. | F16D 66/00 |
| GB | 2566492 A | | 3/2019 | | |
| SE | 539265 C2 | | 6/2017 | | |
| WO | WO-2022157572 A1 | * | 7/2022 | ............. | B60T 13/66 |
| WO | WO-2022157576 A1 | * | 7/2022 | ............. | B60T 13/08 |
| WO | WO-2022157577 A1 | * | 7/2022 | ............. | B60T 13/00 |

* cited by examiner $$F_C = F_{TRC} - (F_{IN} + F_H + F_{AR} + F_{R,RA} + F_{R,FA})$$

Subroutine Trailer brake Temperature

Subroutine P-Control

TRAILER BRAKE CONTROL SYSTEM

CROSS-REFERENCE TO RELATED APPLICATIONS

This application is a national phase entry under 35 U.S.C. § 371 of International Patent Application PCT/IB2021/061301, filed Dec. 3, 2021, designating the United States of America and published in English as International Patent Publication WO 2022/157572 A1 on Jul. 28, 2022, which claims the benefit of the filing date of U. K. Patent Application 2100651.5, filed Jan. 19, 2021, and U. K. Patent Application 2111426.9, filed Aug. 9, 2021, the entire disclosures of each of which are incorporated herein by reference.

FIELD OF THE INVENTION

The invention relates to a control system for a vehicle trailer brake, especially for use in agricultural vehicles such as tractors.

BACKGROUND

Many vehicles are provided with attached trailers for the transportation of goods and materials. For large-scale use such trailers may be provided with trailer braking systems to allow for safe control of the trailer, and to prevent jack-knifing or skidding of the trailer when braking.

Both jack-knifing or skidding occurs when the force applied by the trailer to the towing vehicle, also referred to as coupling force, exceeds a certain level. The coupling force is mainly generated by the trailer weight and the inertia during breaking. A first effect of an excessive coupling force is that the towing vehicle is excessively pushed (later referred to as push condition) and the vehicles track guiding forces are overcome. This results in a yaw moment/movement about the vertical vehicle axis of the towing vehicle which cannot be bear by the wheel-ground contact. The towing vehicle then starts to skid.

A further effect may be that in case of drawbar trailer wherein the front wheels are pivotably attached to the trailer chassis the drawbar may be unintentionally be pivoted relative to the chassis by the coupling force so that the trailer behaves like the jack knife and swerve out of its track.

These effect is especially appearing when the vehicle is decelerated without the driver activating the vehicle service brake system and occurs when downshifting a continuously variable transmission or using a retarders in trucks.

It is well known that these effects can be reduced by activating the brakes of the trailer depending on the coupling force to stabilize the vehicle combination. But the brake activation must be appropriately applied to reduce the coupling force but also to avoid that excessive braking destabilizes the vehicle combination as the combination is stretched excessively which would also apply a yaw moment to towing vehicle.

With the introduction of electronic braking systems wherein the brake force can be controlled independent of the drivers input systems have been developed especially for trucks.

Therefore, trailers used in combination with trucks are mainly using information of on-board assistant systems like electronic trailer suspension, ABS, ESP, ASR to determine the coupling force. Especially the trailer suspension helps to determine the weight of the trailer, other of these sensors help to fine tune the brake actuation by determining wheel speeds and accelerations.

Focusing now on agricultural vehicle combinations, mainly tractors and agricultural trailers, it must be considered that brake systems described above are not as common as for trucks. Especially the trailers are rarely equipped with on-board assistant systems like electronic trailer suspension, ABS, ESP, ASR and therefore the coupling force is difficult to determine.

It may be advantageous to monitor the health of trailer brake systems wherein the brake force is controlled independent of the drivers input systems. One such example of a potential fault is known as "brake fading", resulting from brake element overheating. EP1 441 938B1 suggests to install brake temperature sensors close to the brake disc to determine the temperature of at least on brake assembly. As mentioned above, trailers towed by agricultural tractors are simple in design and not equipped with such sensors.

It is therefore a further target of the invention to determine the temperature of the trailer brakes based on parameters which are already installed on the tractor to keep costs down and reduce complexity.

A known method to determine trailer brake temperature uses trailer brake signal (or pressure) and the duration of the brake actuation generated by the tractor control system. Such a method is described in EP1 441 938B1. However, in such systems temperature warnings may generated even with no trailer in use. It is therefore advantageous to be able to determine if a trailer is connected to the tractor, and furthermore, if the towed trailer is equipped with a trailer brake system. It is common in agricultural operation to use trailers (or more commonly implements) which are fully attached to the three-point linkage but do not have wheels which are braked. So detecting the trailer or an implement just based on the recognition of the trailer current supply connector (which is a standard connection to supply lights etc. on the implement) is not suitable as the implement may not have a trailer brake system even if the connection to trailer current supply connector is detected.

So it is a further target of the invention to generate information/warnings to the driver considering the state of an implement/trailer attached.

Further, if the known method to determine trailer brake temperature based on trailer brake signal (or pressure) and the duration of the brake actuation (generated by the tractor control system) is used the temperature determination may be inappropriate as influencing parameters such as the weight of the trailer are mostly not known for agricultural trailers.

So it is a further target of the invention to improve the known method for trailer brake temperature determination using further available parameters of the tractor to determine the trailer brake temperature more accurately.

It is an objective of the invention to provide a trailer brake control system which overcomes the aforementioned problems to determine the braking force applied to a trailer.

SUMMARY OF THE INVENTION

According to an aspect of the invention there is provided a control system for controlling operation of a trailer brake system associated with an agricultural vehicle-trailer combination, the control system comprising a vehicle control unit, and being configured to: determine a trailer brake temperature; compare the determined trailer brake temperature with one or more temperature thresholds to determine a temperature level condition for the trailer brake; generate a trailer brake signal for controlling the trailer brake system in dependence on the determined temperature level condition; and forward the trailer brake signal to the trailer brake control system to control operation thereof.

A further aspect of the invention provides a braking system comprising and/or being controllable by a control system of the preceding aspect of the invention.

A further aspect of the invention provides an agricultural vehicle coupleable to a trailer to form a vehicle-trailer combination, and comprising and/or being controllable by a control system as described herein.

A further aspect of the invention provides a method of controlling operation of a trailer brake system associated with an agricultural vehicle-trailer combination, comprising: determining a trailer brake temperature; comparing the determined trailer brake temperature with one or more temperature thresholds to determine a temperature level condition for the trailer brake; and controlling the trailer brake system in dependence on the determined temperature level condition.

Further advantageous embodiments and features are described herein with reference to the following description and/or the accompanying claims.

BRIEF DESCRIPTION OF THE DRAWINGS

The invention will now be described, by way of example only, with reference to the accompanying drawings in which.

It will be understood that the term "trailer" as used herein is similar to the terms "attachment" or implement" which is more commonly used in the context with agricultural vehicles such as tractors.

DETAILED DESCRIPTION

Figure 1:
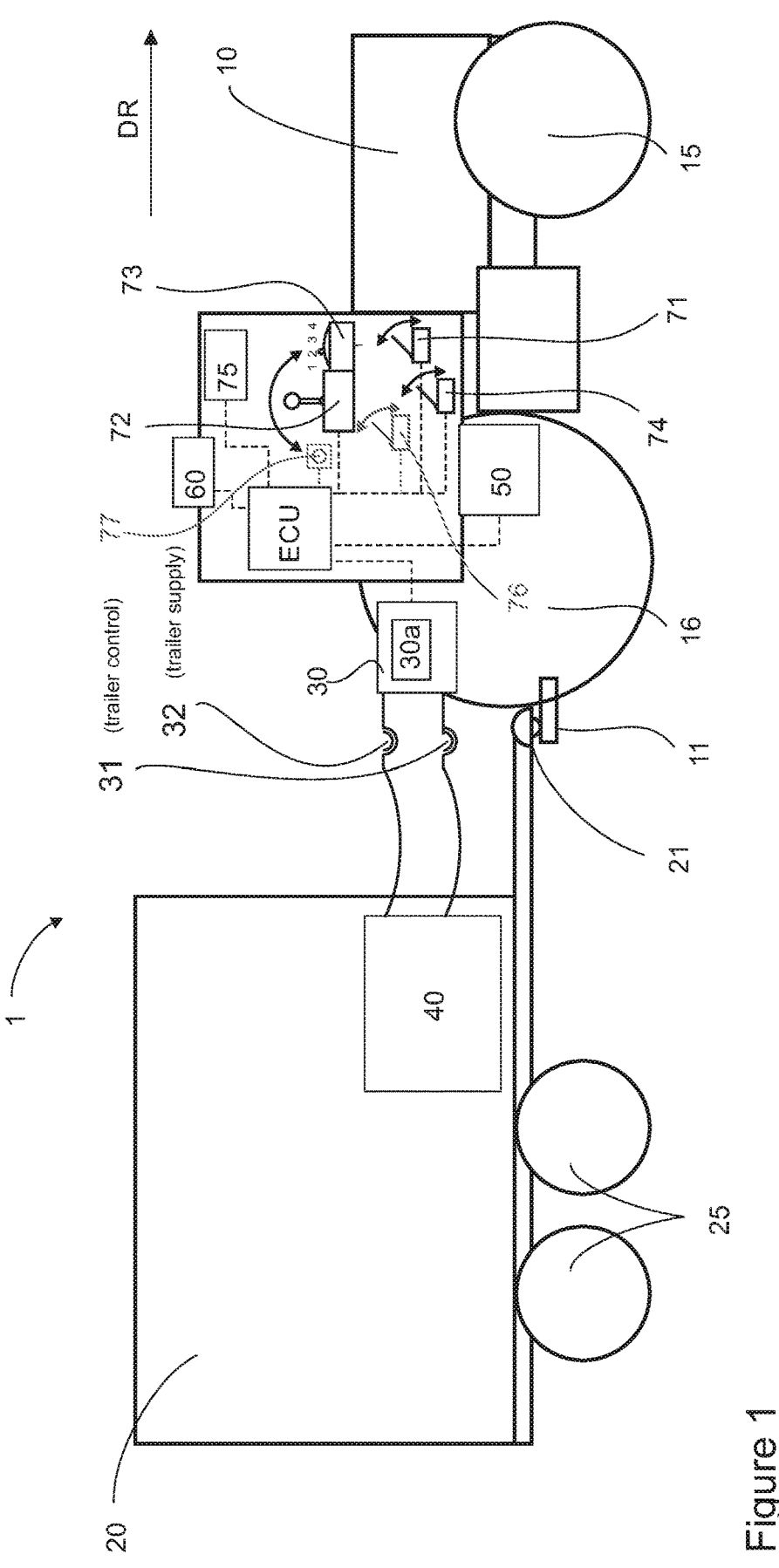
FIG. 1 schematically represents side view of a vehicle combination using the present invention.

FIG. 1 shows a vehicle combination 1 comprising a tractor 10 and a trailer 20 which is attached to the tractor hitch system 11 of the tractor 10 via a trailer drawbar 21. The tractor 10 comprises front and rear wheels 5, 6 which are braked by a service brake system and a park brake systems which is not described hereinafter in detail as well known in the art. To brake the trailer, a trailer brake system 30 mainly including a trailer brake valve 30a and or further valve arrangements and is provided to forward a pneumatic or hydraulic brake signal to the trailer via the standardized trailer control coupling 31. The further trailer supply coupling 32 is provided for air or oil supply to the trailer brakes. Both couplings 31, 32 are used to connected at least the trailer brake system 30 to a brake system 40 of the trailer. The brake system 40 serves to actuate the brakes of the wheels 25 of the trailer 20.

The trailer brake actuation pressure can be generated by trailer brake system 30 e.g. when the driver activates the service brake system with the brake pedal (not shown) and/or the park brake system (with the handbrake lever) of the tractor 10 so that brake demand is directly forwarded by pressurized fluids such as air or oil to the trailer brake system 30. Alternatively a trailer brake actuation pressure may be generated independent of the direct driver activation but in response to a trailer brake signal TBS coming from an electronic vehicle control unit ECU, which is also referred to as electronic trailer braking. This type of brake signal generation is focused in the following invention.

To provide a control system for the trailer brake of the trailer 20, the tractor 10 the electronic vehicle control unit ECU receives parameter and/or sends control signals to various components of the tractor 10. including the following. A transmission 50 to adjust the vehicle speed v or the vehicle acceleration a depending on the demand set values of the driver and receive parameters such as the output rotational speed and rotation direction of the output shaft of the transmission and the system pressure of the hydraulic branch of the CVT (continuous variable) transmission 100. A gyroscope 60 to determine vehicle speed v or the vehicle acceleration and/or inclination a. The gyroscope may be part of a satellite based navigation system. A speed foot paddle 71 and/or a drive lever 72 to receive the drivers input for vehicle speed or a vehicle acceleration. An acceleration rate input 73 to adjust the degree of acceleration/deceleration when moving the drive lever 72. A clutch pedal 74 to disconnect the transmission 50 from the prime mover such as an internal combustion engine. A HMI terminal 75 to enable the driver to input or display various parameters in connection with the vehicle 10, the trailer 10 or the vehicle combination 1. A service brake foot paddle 76 to receive the drivers input for the activation of the service brake of the tractor. A park brake switch or a park brake lever 77 to receive the drivers input for the service brake for the activation of the service brake of the tractor.

To summarise, the electronic vehicle control unit ECU has the major task to provide a processing method which includes: receiving relevant parameters of the vehicle 10; determining a set value for the trailer brake signal TBS according the method described hereinafter; and forwarding the trailer brake signal TBS to the trailer brake control system 30 to activate the trailer brakes.

In the shown embodiment, the trailer brake signal TBS is represented by a pressure demand to control a pneumatic trailer brake system 30. Alternatively, the trailer brake signal TBS may be provided to control a hydraulic brake system and the trailer brake valve 30a is also hydraulically operated. More alternatively, the trailer brake signal TBS may be forwarded to the trailer brake system by any other means such as an electronic signal if brake-by-wire systems are installed on the trailer.

The method for controlling the trailer brake control system 30 will now be described with reference to the flowchart of FIGS. 2, 3, 4, 5.

The method can be implemented on the electronic vehicle control unit ECU or may alternatively be part of the trailer brake control system 30 when equipped with a respective control unit and interface to receive 10 the above mentioned parameters.

According the ongoing method, the electronic vehicle control unit ECU iteratively generates a trailer brake signal TBS to be forwarded to the trailer valve 30*a*. The trailer brake signal TBS receives different values which are described hereinafter.

Figure 2:
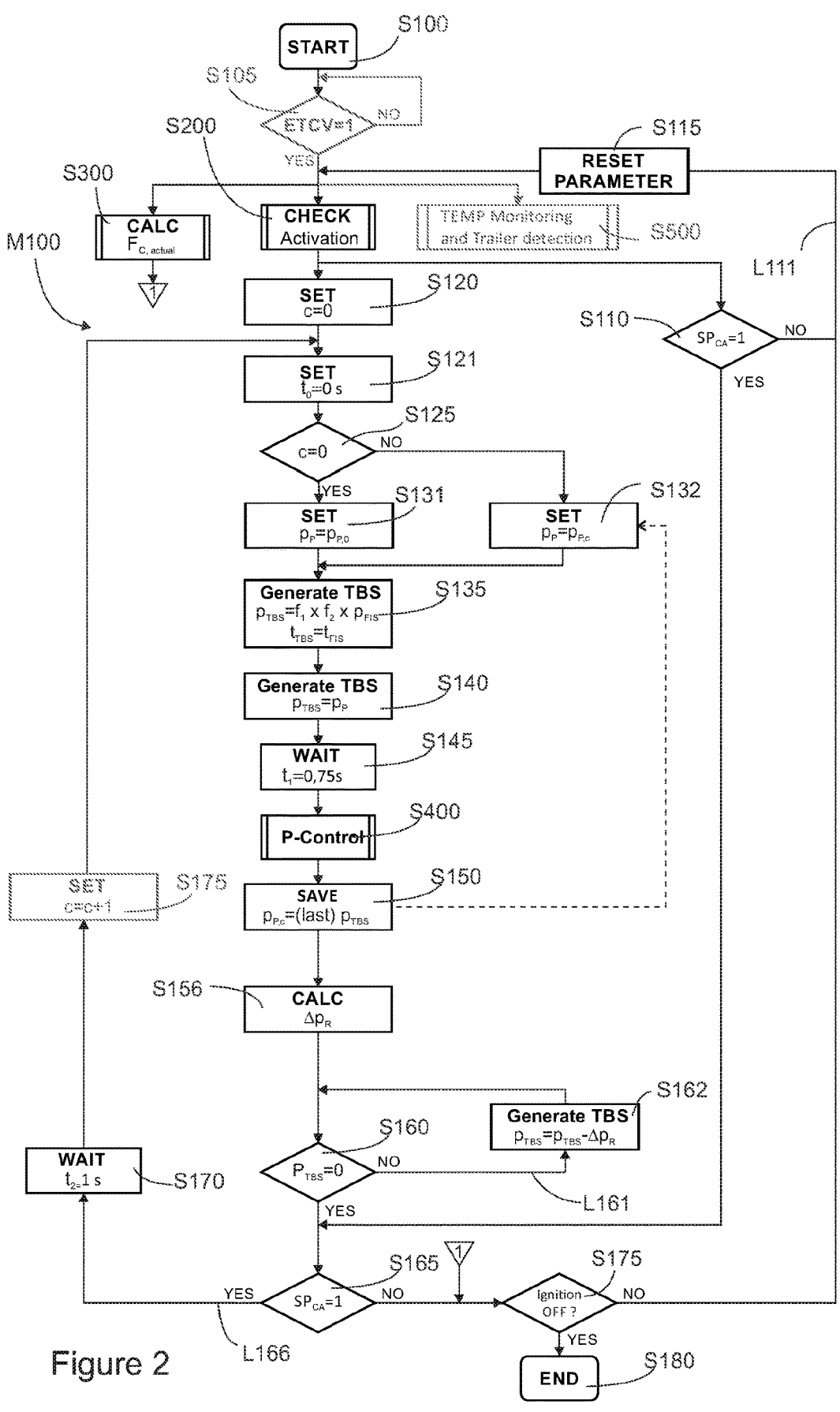
FIGS. 2, 3, 4, 5 are flow charts showing the principal process steps of a method embodying the invention.
Figure 3:
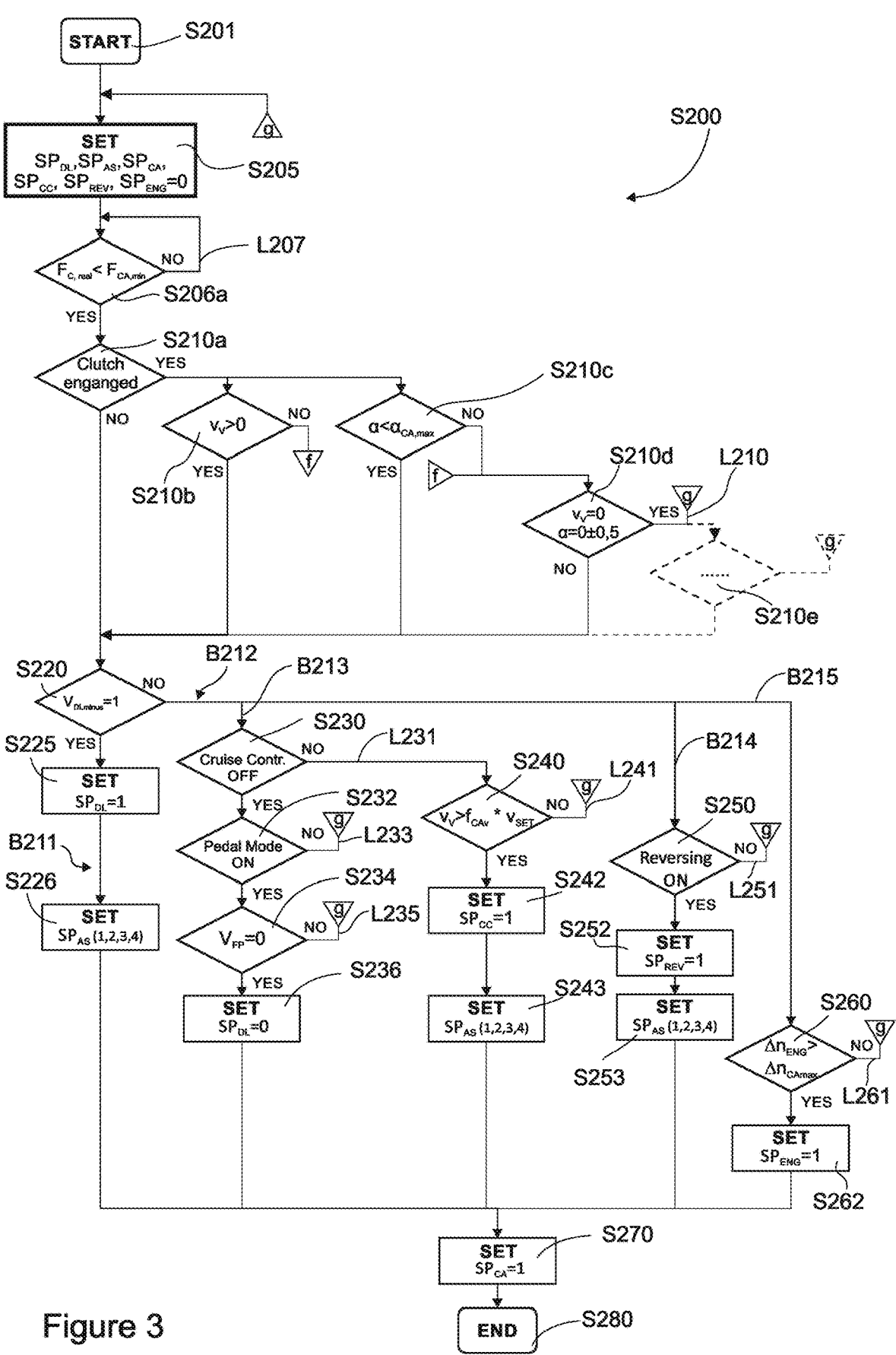
Figure 4:
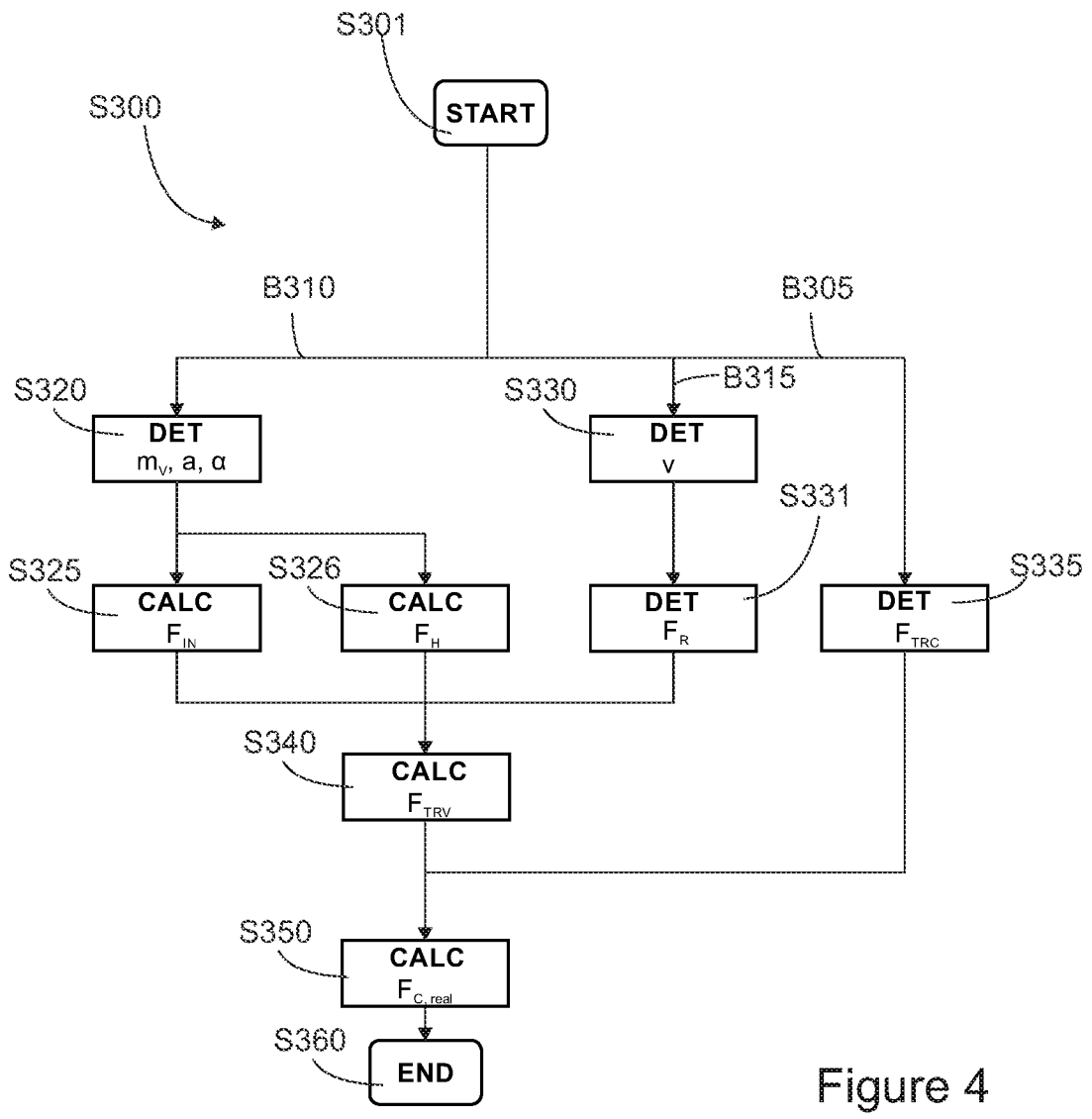
Figure 5:
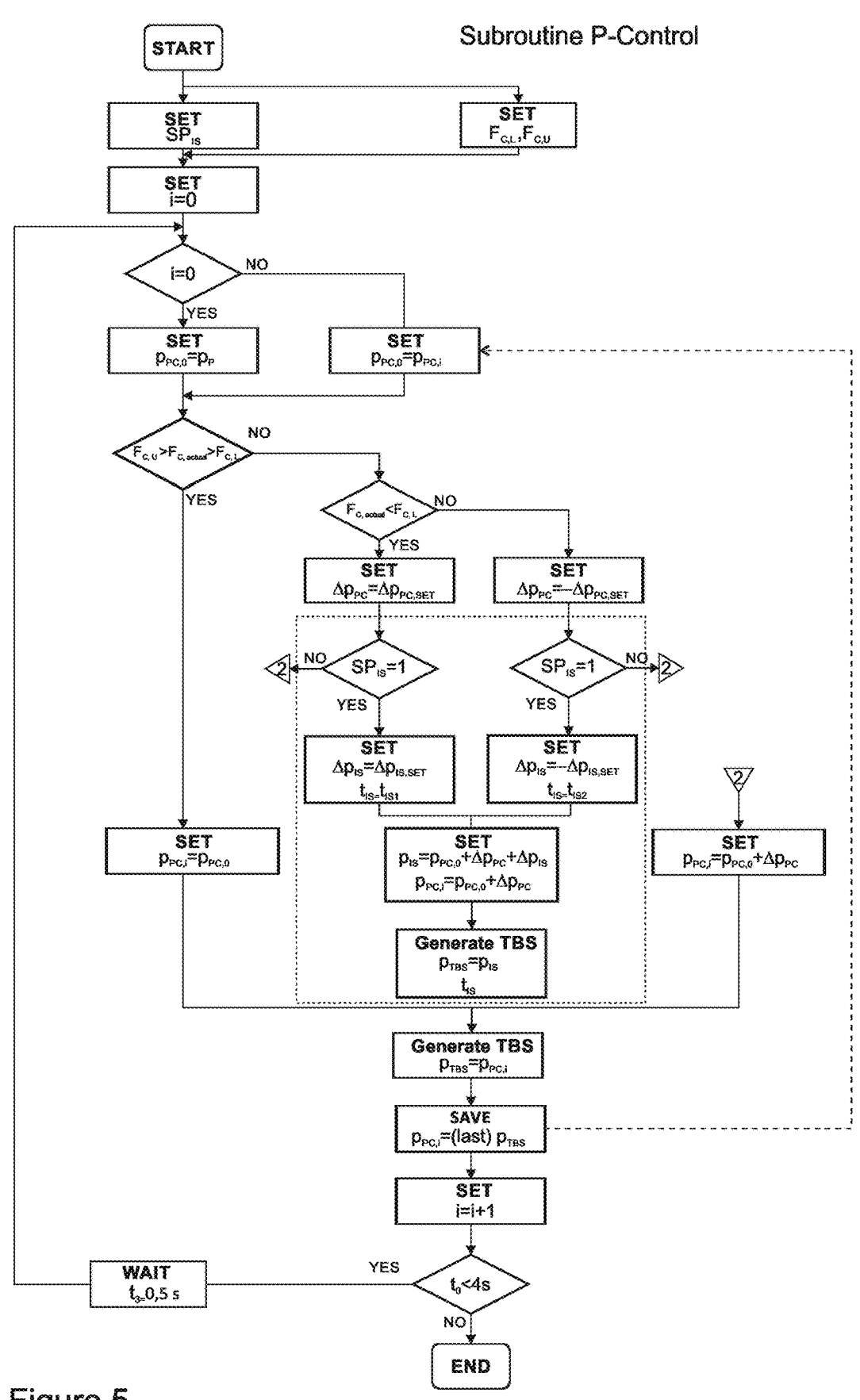

The electronic vehicle control unit ECU executes the method M100 as depicted in FIG. 1. For clarity reasons, the main method M100 is depicted in several sub processes wherein FIG. 2 shows the main method M100 which includes sub process S200 as shown in FIG. 3, sub process S300 as shown in FIG. 4 and sub process S400 as shown in FIG. 5. Further sub processes S500, S600, S700 are described below.

Referring now to FIG. 2, the electronic vehicle control unit ECU is initializing the method with step S100. The initialization may be triggered if the ignition is ON and the electronic vehicle control unit ECU 20 is energized. Alternatively, the initialization may be triggered if the electronic vehicle control unit ECU detect that a trailer 20 is attached to the vehicle 10. This may be determined if the standardized current supply connector (which supplies current to the trailer 20 and/or activates lights or the turn indicator of the trailer 20) is connected to the receiving connector on vehicle 10.

After initialization, the methods checks with step S105 if the electronic trailer brake function is activated (with ETCV=1) and then branches off to subroutines in step S200, S300. The electronic trailer brake may be activated when ignition is ON and the electronic vehicle control unit ECU is energized or may be activated/deactivated by the driver input initially. Alternatively electronic trailer brake may temporarily be aborted by actuation of the service or park brake. Deactivation of the trailer brake function results in the parameter ETCV=0.

In subroutine S200 several pre-conditions and activation parameters for further proceeding in method M100 are checked which are depicted in FIG. 3. The term pre-condition means that these conditions must be met to generally enable activation of the electronic trailer braking while activation parameters serve to determine what event causes deceleration and additionally may establish the degree of deceleration and to adapt the trailer brake signal accordingly.

After starting at S201, step S205 (re)sets status parameters $SP_{DL}$, $SP_{AS}$, $SP_{CA}$, $SP_{CC}$, $SP_{REV}$, $SP_{ENG}$, to zero. The status parameter are explained lateron.

Generally the activation checks pre-conditions which allow the electronic trailer brake function is to be activated and whether and how the vehicle is decelerated, especially but not exclusively if this is done by using the acceleration foot paddle 71 or the drive lever 72. Furthermore, this step serves to determine the driver's demand regarding the degree of deceleration, also referred to as the driver deceleration demand DD.

These pre-conditions try to avoid unsafe vehicle caused by electronic trailer braking but also serve to avoid unmeant or unnecessary electronic trailer braking resulting in that the driver may feel uncomfortable when the assistance system activates trailer brake when it is apparently unnecessary. In other words, electronic trailer braking shall be prohibited when not needed.

Step S206*a* checks a first pre-condition by determining if the coupling force $F_{C, real}$ (see subroutine S300) is below a set value of $F_{CA,min}$, say −3500 N (in a range of negative sign) to ensure that the trailer 20 significantly pushes the tractor 10 (push condition). There are conditions, in which higher coupling force $F_{C, real}$ (smaller when seen with negative sign) may occur but electronic trailer brake should not be activated. E.g. this condition may occur if an implement is initially coupled to the tractor or if potholes are passed. If NO, the process returns prior to step S206*a* with loop L207.

Step S206*a* must be seen as a pre-condition which, when once met, enables the coupling force $F_{C, real}$ to take any value in the further processing, even being above $F_{CA,min}$ without aborting the process or the activation.

In the next steps, a series of further pre-conditions are checked:

Step S210*a* checks if the driveline clutch is activated. This provision is necessary when e.g. the operator intends to let the vehicle combination roll towards a crossing. The method should not be executed further as this results in that the CVT is drivingly disconnected from the wheels so that the determination of the coupling force based on CVT parameters is not possible. So if YES step S210*b* is proceeded to check next pre-condition while NO would be followed by step S220 explained lateron.

The step S210*a* is provided subsequent to step S206*a* (which requires the detection of a coupling force when clutch is disengaged) to make sure that the activation is aborted whenever clutch is subsequently disengaged.

Next, steps S210*b* and S210*c* proceed to check two pre-conditions in an OR relationship which means that one of both is met. According step S210*b* the vehicle speed shall be $v_V$>0 kph (or alternatively $V_{SET}$>0 kph) or according step S210*c* the tractor 10 drives uphill with $\alpha < \alpha_{CA,max}$, of say −4° as a negative sign is downhill inclination, as both conditions are known for resulting in push condition. Alternatively, step S210*b* may consider a minimum value for the vehicle speed $v_V$ or vehicle speed set point $V_{SET}$ to be exceeded to avoid electronic trailer activation at low speeds where push condition is less critical. When one of these pre-condition is met, the method proceeds to step S220 explained lateron. Otherwise, next pre-condition is checked in step S210*d*.

Step S210*d* is provided to avoid that electronic trailer braking is activated in stand still on plane ground (no or small slope). Therefore step S210*d* checks if $v_V$=0 kph (or alternatively $V_{SET}$>0 kph) and the slope is close to zero. This is especially important when a CVT is installed having so called "active standstill" control: If the vehicle is decelerated by speed foot paddle 71 or a drive lever 72 to standstill (0 kph) without service or park brake being activated, the CVT is operated in "active standstill". In this condition, the electronic vehicle control unit ECU provides control of the transmission to maintain the output speed of the transmission (and thereby the wheels) at zero rpm to compensate unmeant movement resulting from idle oil flow in the hydraulic branch of the CVT (as described in applicant's published patent applications EP 1 990 230 and EP 2 935 948). This means, that the hydraulic units are permanently adjust which may result in that a coupling force may be detected which should not result in trailer brake activation.

So to summarize, the steps S210*b*, S210*c* and S210*d* serve to enable electronic trailer braking when driving on even ground, uphill or downhill and when the tractor stands still on downhill as push condition may be present. But when standing uphill or on even ground, activation shall be prohibited as these conditions will not result in push condition.

When step S210d results in YES, the loop L210 returns prior to step 210 with status parameters $SP_{CA}$ remaining zero.

Alternatively further pre-conditions may be checked indicated by step S210d and may result in further processing of step S220 or a loop which returns prior to step 210 with status parameters $SP_{CA}$ remaining zero.

Further pre-conditions not shown in FIG. 3 may be:

CVT switch to "neutral": In this operating condition activated via HMI terminal, the CVT is brought into a condition similar to the clutch engaged described in step S210a with the CVT drivingly disconnected from the wheels so that the determination of the coupling force based on CVT parameters is not possible.

Condition "EU brake test": This condition is activated by the driver to inhibit actuation of the service brake function of the trailer brakes when the park brakes on the tractor are applied in standstill. This test procedure must be regularly done due to EU regulations to check if the park brake system of the tractor (energised by spring load) is capable to sufficiently keep the vehicle combination in standstill (when shut down) if the trailer brakes may fail due to leakage/malfunction in the trailer brake system. The electronic trailer brake must be permanently deactivated during the test without unmeant trailer brake actuation.

Electronic trailer brake function activated: Similar to step S105 (in FIG. 3) the electronic trailer brake function must be activated (with ETCV=1).

Maximum speed requirement: If the vehicle speed exceeds 25 kph. Above a certain vehicle speed, the wheels tend more to lock when braked. Especially at high speeds, this may cause dangerous situations so the method is prohibited above a certain vehicle speed The maximum vehicle speed value may be determined depending on the driver's choice or may also set dependent on trailer parameters. E.g. If the trailer is equipped with ABS system, the limitation may not be necessary.

With the following steps, the method detects in which way the operator inputs a demand to decelerate the vehicle (without actuating service or park brake). This is done in activation branches B211, B212, B213, B214 and B215. Activation branch B211 commences with step S220, in which the activation via the drive lever 72 is checked. If the operator intends to decelerate the vehicle, he pushes back the drive lever 72 in the opposite direction as indicated with arrow DR. Thereby, the demand value $V_{DL}$ which is forwarded to the ECU is in a minus range and the parameter $V_{DLminus}$ is set to 1. If the drive lever 72 is released, vehicle speed remains constant so that parameter $V_{DLminus}$ is set to 0.

If parameter $V_{DLminus}$ is set to 1, this leads to step S225 in which the status parameter $SP_{DL}$ is set to 1 indicating that the deceleration is inputed via drive lever 72. Next step is step S226 in which the value of the acceleration rate input 73 is determined. The acceleration rate input 73 serves to determine the operators input regarding the driver deceleration demand DD on response of the operator's input and therefore offers four set points: level I, II, III, IV. If the operator adjusts the acceleration rate input 73 to level I in which the status parameter $SP_{AS}$ would receive the value 1, the driving speed of the vehicle decreases at slowest so that the deceleration is low and smooth. At Level IV in which the status parameter $SP_{AS}$ would receive the value 4 the driving speed of the vehicle speed decreases rapidly and would result in an "aggressive" deceleration.

Alternatively, the drive lever may provide a proportional speed control which means that the acceleration rate depends on the deflection angle or the deflection speed. In this case, an acceleration grade input 73 may not be present but the status parameter $SP_{AS}$ would be set depending on deflection angle or speed.

If parameter $V_{DLminus}$ is set to 0, which indicates that the vehicle is not decelerated via the drive lever 72, activation branch B212 is further executed in which further operator inputs are checked.

Therefore branch B212 branches of in branch B213, B214 and B215.

With branch B213 the process checks deactivation of the cruise control in step S230. If YES, the deceleration via the speed foot paddle 71 is checked with step S232. The speed foot paddle 71 is depressed by the operator's foot and forwards the speed demand to the ECU. This is different to the driver lever 72 in that the deflection angle is proportional to the demand value for the vehicle speed. In other words, if fully depressed, the demand is maximum vehicle speed or alternatively any vehicle speed limit value which the driver can set via the HMI terminal 75. E.g. if the vehicle is operated for shunting, the driver may set a lower speed assigned to full pedal depression to increase the pedal resolution and enable finer control. If speed foot paddle 71 is fully released (after any depression), the demand for the vehicle speed is zero kph. which means that the vehicle is decelerated. So step S232 checks if the pedal mode is activated. If not, depressing the speed foot paddle 71 would not impact the vehicle movement but only adjust engine speed. As a consequence, the loop L233 returns prior to step S205.

Step S234 checks if the speed foot paddle 71 is completely released (after depression), so that $V_{FP}$ is set to 0. If not, the loop L235 returns prior to step S205.

If YES, step S236 sets the status parameter $sp_{DL}$ to zero. With reference to step S225, in which the parameter is set depending on operation of the drive lever 72, status parameter $sp_{DL}$ is generally providing the information if speed foot paddle 71 or drive lever 72 indicate deceleration.

If step S230 indicates activation of the cruise control, branches B213 is proceeded to determine subsequent condition present in cruise control mode.

Therefore, step S240 determines if the current vehicle speeds exceeds the set point of the cruise control.

This occurs in a first cruise control condition wherein the set point of the cruise control is changed by:

Firstly, the HMI terminal enable driver to save to set points C1 and C2 for different cruise control set points. Both values can be pre-selected by pushing a button assigned to C1 and C2 which may be positioned close or on the drive lever 72. Driver use this HMI function to e.g. switch from a set point used in the field or on the road, e.g. if the C1 is 18 kph for field work and 60 kph for fast travel on roads. The driver activate the set point of the cruise control by using the drive lever 72. While the drive lever 72 is used to accelerate or decelerate the vehicle by moving in driving direction forwards and backwards, moving the drive lever 72 briefly to the right is used to activate cruise control. If none of the values C1 or C2 is pre-selected, the current speed is taken as new set point value.

Secondly, the driver can adjust the set point of the cruise control in the HMI terminal 75 which may also result in a significant deceleration if the new set point is chosen below current vehicle speed.

Even if there is no significant set point speed reduction, cruise control mode may still result in a situation where electronic trailer braking is demanded, referred to as the second cruise control mode. This may happen if the vehicle combination drives in cruise control mode on an even course and then enters a downhill passage. The weight of the trailer would then start to push the tractor resulting in an increase of the vehicle speed and a deviation from the set point.

So to summarize, step S240 determines conditions in cruise control mode in which the vehicle speed is considerably changed with $v_V > f_{CAv} * V_{SET}$ which is when the current vehicle speed $v_V$ exceeds the speed set point $V_{SET}$ of the cruise control about a factor $f_{CAv}$. The factor $f_{CAv}$ represents a percentage variation, so that $f_{CAv} = 1.05$ means that the current vehicle speed $v_V$ exceeds the speed set point $V_{SET}$ about 5%.

If the condition $v_V > f_{CAv} * V_{SET}$ is not met, loop L241 returns prior to step S205.

If the condition $v_V > f_{CAv} * V_{SET}$ is met, step S242 sets the status parameter for activation in cruise control mode $SP_{CC}$ to 1 indicating the activation of electronic trailer braking based on a condition in cruise control mode.

As in the first cruise control mode the degree of deceleration depends on the setting of the acceleration rate input 73, the status parameter $SP_{AS}$ is stored in step S243 similar to step S226.

As in the second cruise control condition the degree of deceleration does not depend on the setting of the acceleration rate input 73, status parameter $SP_{AS}$ may always set to one single value, say 2, when the set point is not changed but the vehicle speed increases relative to set point on downhill drive in second cruise control mode.

A further condition is checked with branch B214 in which the process determines reversing of the tractor. Reversing of the tractor or the vehicle combination means that the operation of the tractor is changed from a first, say forward direction at a predetermined vehicle speed to the opposite direction with the same or a preselected vehicle speed. So reversing always results in deceleration which may cause push condition so that electronic trailer brake must be activated. Reversing can be activated by an operator user interface. The tractor is than decelerated, passes standstill and is changed to the opposite direction driving without further manual intervention. This function offers a comfortable manoeuvring, e.g. during front loader operation. Reversing of the tractor 10 can be initiated by various inputs:

While the drive lever 72 is used to accelerate or decelerate the vehicle by moving in driving direction forwards and backwards, moving the drive lever 72 to the left is used to activate reversing.

Furthermore, a button is provided nearby the steering wheel, e.g. on the indicator lever to reverse the tractor 10.

In addition the driver can chose if reversing is provided only by changing the direction, but with the same speed, or changing direction and decelerate/accelerate to a set point which can be pre-selected in the HMI terminal 75 for each driving direction. This is advantageous drivers may prefer to drive slower in rearward driving So along branch B214 followed by step S250, the method checks if the tractor is reversed. If NO the loop L251 returns prior to step 205.

If the condition is met the status parameter $SP_{REV}$ is set to 1 in step S252 and as the degree of deceleration depends on the setting of the acceleration rate input 73, the status parameter $SP_{AS}$ is stored in step S253.

Further branch B215 and step S260 monitors a decrease of the engine speed. The HMI terminal enable driver to save to set points MAX and MIN for different engine speed set points. Both values can be selected by pushing a button assigned to MAX and MIN which may be positioned close or on the drive lever 72. Alternatively, tractor 10 may be equipped with a hand throttle (not shown) which enables the driver to directly adjust engine speed via a rotary control. As significantly reducing the engine speed results in deceleration, step S260 monitors engine speed difference with $\Delta n_{ENG} > \Delta n_{CAmax}$ and if the engine speed is reduced about more than say $\Delta n_{CAmax} = 200$ rpm, the status parameter $SP_{ENG}$ is set to 1 indicating the activation of electronic trailer braking based on engine speed reduction. This branch may additionally include the determination of a further status parameter to consider a degree of deceleration depending of the absolute value of the difference in engine speed $\Delta n_{ENG}$. The bigger $\Delta n_{ENG}$ is the higher deceleration may be so there may be different deceleration status parameter values for e.g. $\Delta n_{ENG} = 200$ rpm or $\Delta n_{ENG} = 400$ rpm or $\Delta n_{ENG} = 600$ rpm.

All activation branches B211, B212, B213, B214, B215 merge to step S270 in which, when one of the activation requirements in branches B211 to B215 is met, the status parameter $SP_{AS}$ is set to 1, indicating that the activation is generally enabled, independent of whether by drive lever 72 or speed foot paddle 71 or any other condition caused the activation.

With step S250, the method proceeds to step 120 as depicted in FIG. 2.

Parallel to step S200, the step S300 determines the actual coupling force $F_{c, \, actual}$ by considering various driving dynamic parameters as depicted in FIG. 4.

The determination of the actual coupling force $F_{c, \, actual}$ is further explained with reference to FIG. 6a which dramatically depicts the forces exerting on a vehicle combination 1, especially on tractor 10, for the driving condition in which the vehicle combination 1 is driving uphill and in which the danger of jack-knifing is especially high.

The equilibrium of forces applied on the tractor 10 is well known in the art and results in the following equation:

$$F_{TRC} = F_{IN} + F_H + F_{AR} + F_{R,RA} + F_{R,FA} + F_C \tag{E1}$$

Wherein $F_{TRC}$ is the Tractive Force which must be supplied to wheels 5,6 of the tractor 1 by the IC engine and the transmission 50 to move the complete vehicle combination 1.

$F_{IN}$ is the Inertia Force which applies due to the inertia when the vehicle is accelerated or decelerated:

$$F_A = m_v \cdot a \tag{E2}$$

$F_H$ is the Downhill-slope Force which applies due to the inertia when the vehicle is driving uphill or downhill:

$$F_H = m_v \cdot g \cdot \sin(\alpha) \tag{E3}$$

11

$F_{AR}$ is the Air resistance Force applied by air resistance and depends on various factors such as the geometry of the tractor $F_{R,RA}$, $F_{R,FA}$ Is the Roll Resistance Force applied by rolling resistance between wheel and ground an depends various parameters such as wheel load and ground/wheel contact parameters $F_C$ Is the Coupling Force which represents the force applied by the trailer to the tractor. In case of deceleration the coupling force is of negative sign.

The mass $m_v$ of the vehicle is determined according the prior art and is not described in detail. The mass my may be determined by considering the empty weight of the tractor plus additional ballast attached thereto. These values may be stored in the ECU. Alternatively, mass values could be taken from vehicle acceleration or wheel load detection. A method is described in applicant's published patent application EP2766239.

The same applies to the determination of the vehicle acceleration a, inclination a and speed v of the vehicle which is described and practised in the art. Both values may be determined by gyroscope 60 which may be part of a GPS navigation system.

Figure 6A:
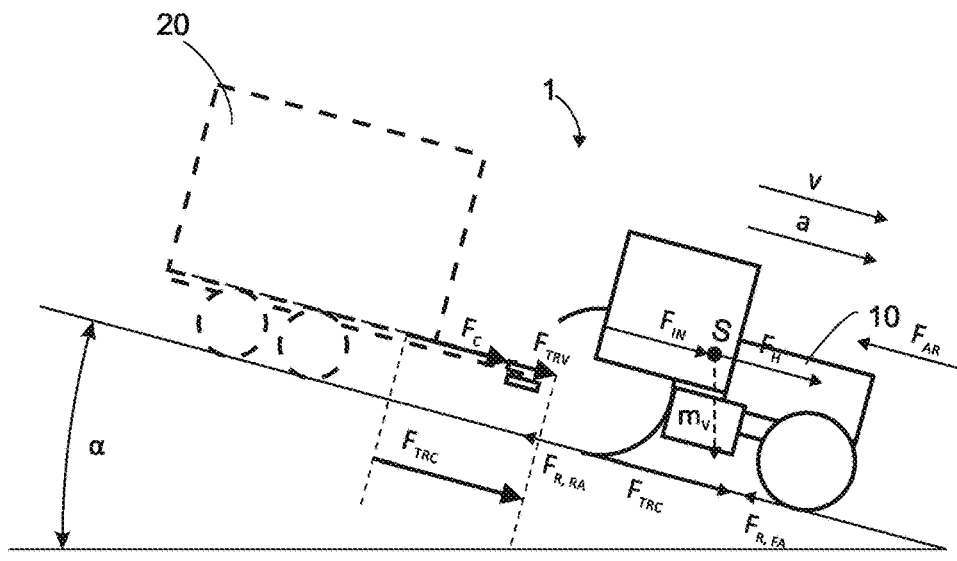
FIG. 6a schematically represents side view of a vehicle combination and the forces applied using the present invention.

The force must be inserted with negative or positive signs according the effective direction shown in FIG. 6a.

Similar forces would occur resulting from mass of the trailer and resistances applied on the trailer itself. But the method only considers the resulting forces applied by the trailer to the tractor, which the coupling Force $F_C$. Only consider parameters applied to the tractor has the major advantages, that the trailers must not be equipped with sensors or considered in detail. As mentioned above, the variety of different trailers/implements and their basic technical configuration may impede detailed considerations of the trailer.

As mainly Coupling Force $F_C$ is the relevant parameter to control the trailer brake system, the equation E1 is changed:

$$F_C = F_{TRC} - (F_{IN} + F_H + F_{AR} + F_{R,RA} + F_{R,FA}) \tag{E4}$$

The forces in brackets represent the Tractive Force of the towing vehicle $F_{TRV}$.

$$F_{TRV} = F_{IN} + F_H + F_{AR} + F_{R,RA} + F_{R,FA} \tag{E5}$$

While the Inertia Force $F_{IN}$ and downhill-slope Force $F_H$ can be easily determined during operation using the parameters already available on the tractor, the air resistance force $F_{AR}$ and Roll Resistance Force $F_{R,RA}$, $F_{R,FA}$ is summarised to an Overall Resistance Force $F_R$.

$$F_{TRV} = F_{IN} + F_H + F_R \tag{E6}$$

Figure 6B:
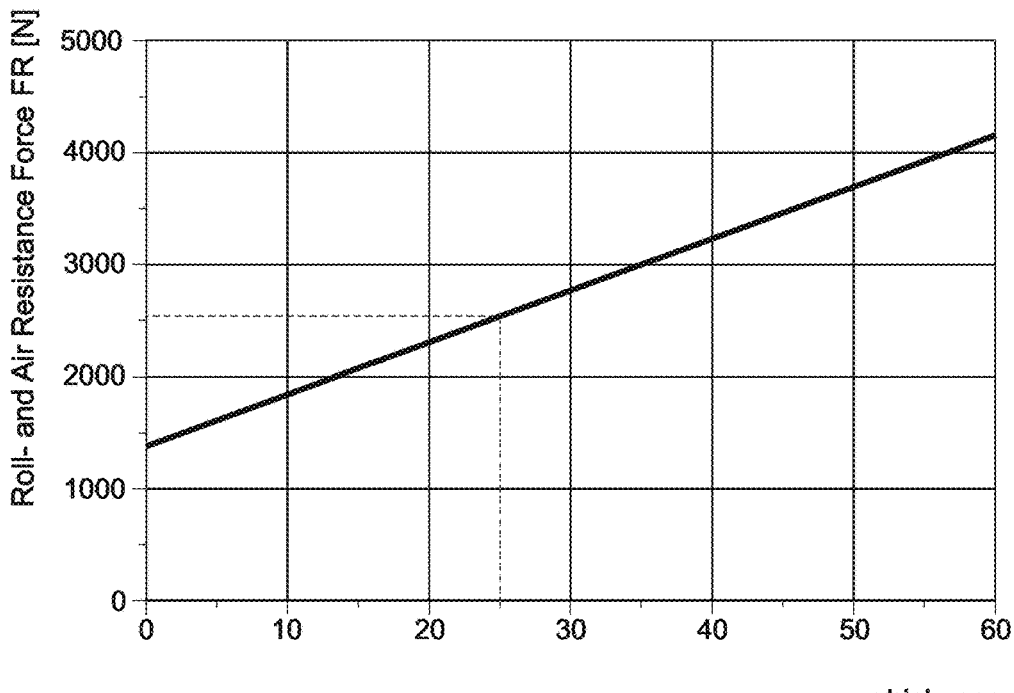
FIG. 6b is a characteristic map showing the resistance force depending vehicle speed.

The Overall Resistance Force $F_R$ is taken from the graph shown in FIG. 6b in which the vertical axis shows the Overall Resistance Force $F_R$ and the horizontal axis shows the vehicle speed v. The graph is determined by coast down tests during development and is then stored for each vehicle series in the ECU. The shown graph is determined for a vehicle on asphalt (or road operation). Alternatively, further graphs may be determined for grassland, farmland or gravel tracks which could then be considered when the vehicle is provided with means to detect on which terrain the vehicle drives. This may be determined by GPS navigation system which delivers the geographic information, eg. if the vehicles is driving on a public road (on asphalt), on a gravel track or offside any road, which may be grassland or farmland.

E.g. in the shown graph the Overall Resistance Force $F_R$ at say 25 kph is considered to be 2575 N So by using equations E1 and E2 and the graph shown in FIG. 6b the Tractive Force of the towing vehicle $F_{TRV}$ can be adequately determined with equation E6.

To receive the Coupling Force $F_C$, the remaining equation is:

$$F_C = F_{TRC} - F_{TRV} \tag{E7}$$

The Tractive Force of the vehicle combination FTRC is determined as known in prior art by measuring the fluid pressure in a Continuously Variable Transmission (CVT) of the hydrostatic-mechanical split type which includes a hydraulic drive circuit in which a hydraulic pump supplies pressurized fluid to a hydraulic motor. Details are explained in applicant's published patent application WO2013/053645 and are no explained in detail. Alternatively, any other means to determine the Tractive Force of the vehicle combination FTRC such as using the torque supplied by the engine to receive the tractive force as described in U.S. Pat. No. 4,548,079 may be taken instead. (See GB11/44)

The Coupling force can then be received with equation E7.

Using afore mentioned equations and forces the method in FIG. 4 is proceeded. After starting with step 301, a first branch B305 determines the Tractive Force of the vehicle combination $F_{TRC}$ in step S335 as explained above.

A second branch B310 determines the mass $m_v$, acceleration a and the inclination $\alpha$ in step S320 as explained above to further calculate Inertia Force $F_{IN}$ in step S325 and downhill-slope Force $F_H$ in step 326.

In a third branch B315, step S330 determines speed v of as explained above to further determine Overall Resistance Force $F_R$ in step S331 with reference to FIG. 6b.

Second branch B310 and third branch B315 then proceeds into step S340 to calculate Tractive Force of the towing vehicle $F_{TRV}$ as defined with equation E6.

Finally, the values received in step S335 and S340 are then used to calculate the actual Coupling Force $F_{C, actual}$ according equation E7.

Alternatively the steps shown in FIG. 4 may be proceeded in one by one or in any reasonable order.

With reference to FIG. 2, sub process S300 is permanently proceeded to deliver the actual Coupling Force $F_{C,actual}$ for further steps.

The method M100 in FIG. 2 further continues with permanently monitoring the status parameter $SP_{CA}$ in step S110 which indicates that the driver still demands vehicle deceleration via speed foot paddle 71 or drive lever 72. If the activation is interrupted and status parameter $SP_{CA}$ is changed to zero, the loop L211 resets all parameters in step S115 and returns to START.

The method M100 in FIG. 2 further continues with step S120 which is setting a first interval counter c, also referred to as the brake interval counter) to zero. Then in step S121 a first timer value $t_0$ is also set to zero (seconds) and a timer is started. Both parameters are provided to fulfil the requirements for electronic trailer brake systems according EU-Regulation 2015/68 (dated 15.10.2014), Appendix I, Number 2.2.1.19.1 (also referred to as "EU Mother regulation RVBR") which limits the duration of electronically activated trailer braking (without the driver operating the service brake) to a maximum duration of 5 s. After this the trailer brake must be released.

The first time value to is used to monitor the time limit while the brake interval counter c is used to determine the number of the brake intervals. A brake interval is thereby characterised by a time period in which the electronic trailer brake control is activated/enabled and may be followed by an optional pause time, in which the trailer brake is not activated. The next brake interval starts when the trailer brake is activated again after being in pause. The brake interval is thereby interrupted if activation requirements as described in step 200 are not meet and status parameter $SP_{CA}$ returns to zero. This results in the reset of all parameters in step 115 and thereby also the first interval counter c and first timer value $t_0$, discussed in detail herein.

Step S125 checks if the method is currently proceeding in the first brake interval (meaning that the time limit has not been exceeded) or in a subsequent brake interval.

If YES step S131 sets the pilot pressure $p_P = P_{P,0}$ which solely depends on the driver deceleration demand DD as determined in step S200. Generally, pilot pressure pp increase with higher deceleration demand:

If the deceleration results from the operator using the speed foot paddle 71 (resulting in the status parameter $SP_{DL}=0$), the pilot pressure $P_{P,0}$ is set to 70 kPA.

If the deceleration results from the operator using the drive lever 72 (resulting in the status parameter $SP_{DL}=1$), the pressure level depends on setting of the acceleration rate input 73 which is provided by status parameter $SP_{AS}$:

For $SP_{AS}=1$ (acceleration rate input 73 set to level I representing slowest deceleration), the pilot pressure $P_{P,0}$ is set to 50 kPA.

For $SP_{AS}=2$ (acceleration rate input 73 set to level II), the pilot pressure $P_{P,0}$ is set to 70 kPA.

For $SP_{AS}=3$ (acceleration rate input 73 set to level III), the pilot pressure $P_{P,0}$ is set to 100 kPA.

For $SP_{AS}=4$ (acceleration rate input 73 set to level IV), the pilot pressure $P_{P,0}$ is set to 150 kPA.

The same values are taken if the deceleration results from the cruise control (Receiving YES in step S240) resulting in the status parameter $SP_{CC}=1$ in step S242 or if the deceleration results from the reversing mode being activated (Receiving YES in step S250) resulting in the status parameter $SP_{REV}=1$ in step S252.

If the deceleration results from the engine speed decrease with step S260 resulting in YES (and the status parameter $SP_{ENG}$ set to 1), the pilot pressure $P_{P,0}$ is set to 80 kPA In the embodiment, the set values for pilot pressure $P_{P,0}$ depending on status parameter $SP_{AS}$ are shared over different deceleration conditions (with one of status parameters $SP_{DL}$, $SP_{CA}$, $SP_{CC}$, $SP_{REV}$, $SP_{ENG}$ set to 1) but may alternatively be defined differently for each deceleration conditions.

The values are kept in the ECU and taken considered further in step S140 explained herein.

If step S125 shows that the method is currently proceeding in a subsequent brake interval, step S132 sets the pilot pressure $p_P = p_{P,c}$ which is the trailer pressure signal TBS generated at step S150. This results in the advantage that after the end of a brake interval, the pilot pressure pp always receives the value which was last generated in the previous brake interval. This avoids trailer brake signal peaks between brake intervals which would decrease driving comfort.

In step S135, a trailer brake signal TBS is generated, also referred to "First-in-Shot". This step serves to provide a pressure peak which is used to fill the lines on the trailer. As the trailers in agricultural business vary in size and therefore also the lines of the trailer brake systems may vary, this step is provided to keep bias the system and make it more responsive. The height of the Trailer brake signal TBS, or the trailer brake actuation pressure must be chosen high enough to fill the lines but low enough to avoid an excessive brake reaction which would result in jerking and negative impact on driving comfort. Therefore the "First-in-Shot" is time controlled and depends on the driver deceleration demand DD as determined in step S200.

If the deceleration results from the operator using the speed foot paddle 71 (resulting in the status parameter $SP_{DL}=0$), the first-in-shot-pressure $P_{FIS}$ is to 300 kPA and the duration is set to 0.03 s If the deceleration results from the operator using the drive lever 72 (resulting in the status parameter $SP_{DL}=1$), the pressure level and duration depends on setting of the acceleration rate input 73 which is provided by status parameter $SP_{AS}$:

For $SP_{AS}=1$ (acceleration rate input 73 set to level I representing slowest deceleration), the first-in-shot-pressure $P_{FIS}$ is to 300 kPA and the duration is set to 0.02 s.

For $SP_{AS}=2$ (acceleration rate input 73 set to level II), the first-in-shot-pressure $P_{FIS}$ is to 300 kPA (alt. 320 kPA) and the duration is set to 0.03 s.

For $SP_{AS}=3$ (acceleration rate input 73 set to level III), the first-in-shot-pressure $P_{FIS}$ is to 300 kPA (alt. 340 kPA) and the duration is set to 0.04 s.

For $SP_{AS}=4$ (acceleration rate input 73 set to level IV), the first-in-shot-pressure $P_{FIS}$ is to 300 kPA (alt. 360 kPA) and the duration is set to 0.05 s.

The same values are taken if the deceleration results from the cruise control (Receiving YES in step S240) resulting in the status parameter $SP_{CC}=1$ in step S242 or if the deceleration results from the reversing mode being activated (Receiving YES in step S250) resulting in the status parameter $SP_{REV}=1$ in step S252.

If the deceleration results from the engine speed decrease with step S260 resulting in YES (and the status parameter $SP_{ENG}$ set to 1), the pilot pressure $P_{P,0}$ is set to 80 kPA In the embodiment, the set values for first-in-shot-pressure $P_{FIS}$ is to 300 kPA and the duration depending on status parameter $SP_{AS}$ are shared over different deceleration conditions (with one of status parameters $SP_{DL}$, $SP_{CA}$, $SP_{CC}$, $SP_{REV}$, $SP_{ENG}$ set to 1) but may alternatively be defined differently for each deceleration conditions.

In addition, two correction factors $f_1$, $f_2$ are multiplied with the first-in-shot-pressure $P_{FIS}$ to determine the trailer brake signal $p_{TBS}$:

$$P_{TBS} = f_1 \times f_2 \times P_{FIS} \tag{E8}$$

The Correction factor $f_1$ is in a range between >0 ... 1 and considers the fact that with increasing vehicle speed, high First-in-Shot pressure peaks result in that the trailer tends to jerk which negatively impacts the driving comfort. On the other hand, when the vehicle combination 1 drives downhill, the trailer brake system reaction should be as fast as possible. The equation for correction factor $f_1$ is:

$$f_1 = \frac{v}{v_{Limit}} + \frac{\alpha}{\alpha_{Limit}} - \frac{\alpha * v}{\alpha_{Limit} * v_{Limit}} \qquad \text{(E8.1)}$$

Whereby $v_{Limit}$ is the vehicle speed, below which the First-in-Shot pressure shall be reduced. This value is set to 25 kph $\alpha_{Limit}$ is the inclination, below which the First-in-Shot pressure shall be at maximum level independent of the vehicle speed. This value is set to $-5°$ The Correction factor $f_2$ is also in a range between $>0 \ldots 1$ and considers the fact pressure level of the "First-in-Shot" is reduced during the process to avoid overshoots in the trailer brake actuation pressure reducing driving comfort. The equation for correction factor $f_2$ is:

For first brake interval (C=0):

$$f_2 = \frac{p_{P,0}}{p_{Limit}} \qquad \text{(E8.2)}$$

For any subsequent brake interval (C>0):

$$f_2 = \frac{p_{P,c}}{p_{Limit}} \qquad \text{(E8.3)}$$

Whereby $P_{P,0}$ is the pilot pressure determined in step S131 taken from a predetermined parameter set.

$P_{P,c}$ is the pilot pressure determined in step S132 taken from a previous brake interval $P_{Limit}$ is a pressure limit below which the First-in-Shot" is increasingly reduced. May be 100 kPA After step the time controlled generation of the trailer brake signal TBS in step S135, step S140 is straight away generating a trailer brake signal TBS based on the pressure determination as described in Steps 131, 132. The trailer brake signal TBS generated in step S135 is maintained constant until the ECU is generating a further pressure signal TBS as explained herein.

Applying a pilot pressure depending on the deceleration condition indicated by an HMI input offers the main advantage that trailer brake actuation is initially started without determining the physical values for deceleration or coupling force at first so that the trailer brake activation is more proactive and faster. Even with step S206a considering a coupling force, the pilot pressure does not depend in size at an initial step.

In step S145 the process is waiting for 0.75 s to enable the ECU to determine the actual coupling force $F_{C, actual}$ as described with step S300. The waiting period is necessary to consider the effects of the trailer brake signals TBS generated with steps S135. S140 and the resulting changes in the actual coupling force $F_{C, actual}$. Otherwise, the ongoing process would be based on a coupling force $F_{C, actual}$ which is still changes under the influence of steps S135, S140.

Especially step S140 serve to provide a fast reaction on the deceleration in form of trailer brake signal TBS based on predetermined pressure values while in the ongoing process, a 3-point control algorithm is applied to determine trailer brake signal TBS. This makes the system responsive in the first.

The control algorithm is executed with step S400 as explained in detail in FIG. 5.

Step S400 and the subsequent steps S401 to S 490 mainly contains the steps to control the trailer brake signal TBS by means of a 3-point controller. Generally a 3-point controller represents a discontinuous controller type and takes three values, which are 1. 0 and −1. Regarding the generation of trailer brake signal TBS, trailer brake signal TBS, respective the pressure value is increased, kept constant or decreased. Compared to continuous controller types, such as P, I, or D-Controllers or combinations of them, the 3-point controller tends less to overshooting and can be handled easier in terms of setting parameters to influence the controller dynamics. Especially these values may be easier adapted to operating conditions, which may be done by the driver or trained service personal.

After the start with step S401, step S405 is setting a status parameter, the In-Shot parameter $SP_{IS}$. An In-Shot is a time controlled pressure peak similar to the First-in-Shot explained with step S135 but is applied in combination with the 3-point controller. If the In-Shot parameter $SP_{IS}$=0, no In-shot is provided, if the In-Shot parameter $SP_{IS}$=1 an In-shot is provided. The in-Shot serves to increase responsiveness by supporting the pressure build up in the trailer brake system 40. But as pressure peaks may result in jerking of the trailer, the In-Shots may be deactivated if the Coupling force (which is permanently determined shows) a rapid decrease. As a rapid decrease (determined in Step S300) indicates a fast reaction to trailer brake signal TBS further In-shots may be omitted. The in-shot is explained in more detail herein.

In parallel (or subsequently) with steps S405, step S406 is proceeded in which the ECU takes the predetermined values defining a coupling force range defined by lower coupling force $F_{C, L}$ and a upper coupling force $F_{C, L}$ which is need to realize a 3-point controller and which is explained herein.

Next a second interval counter i, also referred to as the controller interval counter, is set to zero in step S407.

The controller interval counter i is used to determine the number of the control interval in step S410. In the first interval with counter i=0 the method proceeds with step S415 in which the controller pressure $p_{PC,0}$ is set to the value $p_P$ which was determined in step S140.

For the next interval (i>0) and with step S416, the controller pressure $p_{PC,0}$ is taken from the subsequent controller interval as stored in step S465 and depicted with $p_{PC,i}$. This results in the advantage that after the controller pressure $p_{PC,0}$ always receives the value which was last generated in the previous controller interval. This avoids trailer brake signal peaks between brake intervals which would decrease driving comfort.

With step S420, the 3-point controller is adjusting the pressure values based on the initial settings of controller pressure $p_{PC,0}$ in step S415, S416.

Coming back to step S406, the coupling force band defined by lower coupling force $F_{C,L}$ and upper coupling force $F_{C,L}$ is now explained in detail. Both values have a negative sign (as they are counteracting the vehicle) and are needed to operate the 3-point controller.

The lower coupling force $F_{C,L}$ represents a value which shall not be undercut as this may cause the vehicle 10 to become unstable due to the force applied and the resulting yaw moment about the vertical vehicle axis. This value is stored in the ECU and may vary for different vehicle configurations. E.g. a lightweight vehicle cannot bear the same force/yaw moment compared a vehicle 10 with higher weight. The same applies depending on wheel base or wheel width which also influence the vehicle stability.

The upper coupling force $F_{C,L}$ represents a value which shall not be exceed as the brake actuation shall be stopped before the coupling force gets zero. Driver's demand that the trailer is allowed to coast e.g. when the vehicle combination 1 approaches a road crossing. This means that a small coupling force is acceptable.

With steps S420, S435 and S437 the 3-point controller checks the value of the actual coupling force $F_{C, actual}$ relative to the coupling force band defined by lower coupling force $F_{C,L}$ and upper coupling force $F_{C,L}$.

If the actual coupling force $F_{C, actual}$ is within the coupling force band, step S430 is setting the controller pressure $p_{PC,i} = p_{PC,0}$ which means that the pressure value determined in step S415 or S416 is taken without pressure adaption.

If the actual coupling force $F_{C, actual}$ undercuts the lower coupling force $F_{C,L}$ as checked in step S435, branch B436 is proceeded and step S438 is setting a controller pressure increase with $\Delta P_{PC} = \Delta P_{PC,set}$. The value for $\Delta P_{PC,set}$ is stored in the ECU and is 15 kPA. This means, that the pressure will be increased to increase brake force on the trailer.

If step 435 is not met, the actual coupling force $F_{C, actual}$ exceeds the upper coupling force $F_{C,U}$, branch B437 and step S439 is setting a controller pressure increase with $\Delta P_{PC} = -\Delta P_{PC,set}$. This means, that the pressure will be decreased to reduce brake force on the trailer.

The method then proceeds in two parallel branches into the steps encircled with a dotted line 440 which serve to apply the In-shot not.

Following the branch B436, if the In-Shot parameter $SP_{IS}$ was set to 1 in step S405 (indicating In-shot activation), step S441 results in that step S445 is proceeded. Otherwise the method proceeds to Step 451 without applying in-shot. In step S445 the In-shot parameters are set to define a time-controlled pressure increase with $\Delta P_{IS} = \Delta P_{IC,set}$ for a duration of $t_{IS} = t_{IS1}$. The value $\Delta P_{IC,set}$ and the time $t_{IS1}$ is stored in the CU and is 100 kpa and 0.05 s.

Following the branch B437, if the In-Shot parameter $SP_{IS}$ was set to 1 in step S405 (indicating In-shot activation), step S442 results in that step S446 is proceeded. Otherwise the method proceeds to Step 451 without applying in-shot. In step S446 the In-shot parameters are set to define a time-controlled in-shot pressure increase with $\Delta P_{IS} = -\Delta P_{IC,set}$ for a duration of $t_{IS} = t_{IS2}$ (which is decrease due to the negative sign). The value $\Delta P_{IC,set}$ and the time $t_{IS2}$ is stored in the CU and is 100 kpa and 0.1 s. The duration in this step is greater as with step S445 due to the fact that the reaction time of the trailer brake system is higher when the pressure is decreased. This is balanced by a longer in-Shot duration.

Both steps S445 and S446 are continued in step S450 in which pressure values are set:

As the in-Shot was activated, the In-shot pressure $P_{IS}$ is calculated by the equation $$p_{IS} = p_{PC,0} + \Delta p_{PC} + \Delta p_{IS} \qquad \text{(E9.1)}$$

This means that the pressure for the In-shot is received by the sum of the controller pressure $p_{PC,0}$ (as set in step S415 or step S416), the controller pressure increase $\Delta P_{PC}$ (as set in step S438 or step S439) and the in-shot pressure increase with $\Delta P_{IS}$ (as set in step S445 or step S446).

In addition the controller pressure $p_{PC,i}$ is calculated by the equation $$P_{PC,i} = p_{PC,0} + \Delta p_{PC} \qquad \text{(E9.2)}$$

This means that the pressure for the controller pressure is received by the sum of the controller pressure $P_{PC,0}$ (as set in step S415 or step S416), the controller pressure increase $\Delta P_{PC}$ (as set in step S438 or step S439) but without the in-shot pressure increase with $\Delta P_{IS}$.

In step S455 the ECU generates a trailer brake signal TBS with the trailer brake signal $P_{TBS} = P_{IS}$ for a duration $t_{IS}$. This step overwrites the trailer brake signal TBS generated in step S140 (in FIG. 2).

If the in-Shot was not activated in steps S441 or S442 the controller pressure $p_{PC,i}$ is calculated in step S451 by the equation $$P_{PC,i} = p_{PC,0} + \Delta p_{PC} \qquad \text{(E9.3)}$$

After one of step S430 or step S451 or step S455, the method proceeds with step S460 which generates a trailer brake signal $P_{TBS} = P_{PC,i}$ determined in step S430, step S450 or step S451. This brake signal is not time-controlled and thereby upheld until the next controller interval.

The last value of the trailer brake signal TBS is then saved in the ECU with step S465 for consideration in the next controller interval in step S416.

Alternatively step S430 may result in that the method is proceeds with step S465 as there is no pressure increase and the trailer brake pressure generated in step S140 (see FIG. 2) is still upheld.

In step S475 the controller interval counter i is increased by 1 for characterising an subsequent interval as requested for step S410.

In step S480 the timer value for $t_0$ is controlled, if the timer value $t_0$ is below 4 s, the method proceeds with loop L481 which includes step S485 so that the process is waiting for $t_3 = 0.5$ s to enable the ECU to determine the actual coupling force $F_{C, actual}$ as described with step S300 and return.

In step S145 the process is waiting for 0.75 s to enable the ECU to determine the actual coupling force $F_{C, actual}$ as described with step S300 and then return prior to step 410.

If in step S480, the timer value $t_0$ exceeds 4 s, step S490 aborts the sub process S400 and returns to main method M100 depicted in FIG. 2.

To summarise, sub process S400 is continuously adapting the trailer brake signal TBS by applying the 3-point controller and an optional In-shot until the time of 4 s is reached. In the meantime, the process passes several controller interval, whereby subsequent interval are based on the trailer brake signal TBS generated in the previous interval.

Coming now back to FIG. 2, step S150 saves the last value of the trailer brake signal in the ECU for consideration in the next brake interval in step S132.

Afterwards in step S475 the brake interval counter c is increased by 1 for characterising an subsequent interval as requested for step S125.

As already mentioned, the timer value $T_0$ is provided to ensure that the brake actuation is not active for more than 5 s. To avoid that the trailer brake signal TBS (and the brake actuation) abruptly falls to zero, the sub process S400 is aborted after 4 s. The remaining time of 1 s is used to ramp down the trailer brake signal TBS to zero before the 5 s are passed.

Depending on the last trailer brake signal TBS and the cycle time of the ECU (which is the time required for the execution of one simple processor operation in the ECU) step S156 calculates a ramp pressure decrease $\Delta p_R$ according the equation:

$$\Delta p_R = \frac{t_c \times p_{tbv}}{t_R} \quad \text{(E10)}$$

Whereby $t_C$ is the cycle time of the processes in the ECU, which is 50 ms $t_R$ is the ramp time, which is 1 s $P_{TBV}$ is last trailer brake signal TBS For a last trailer brake signal TBS of 100 kPa equation E10 would determine a ramp pressure decrease $\Delta p_R$ of 4 kPa.

So as long as step S160 does not show that the trailer brake signal TBS is zero, the loop L161 and step S162 is repeatedly proceeded to generate a trailer brake signal TBS which is reduced with $\Delta p_R$. The loop L161 is repeated and returns prior to step S160 until the trailer brake signal TBS is zero.

As long as the activation signal is present in step S165 with $SP_{CA}=1$ the process proceeds with loop L166 in which step S170 contains a waiting period of $t_2=1$ s and returns prior to step S121 to proceed with the next brake interval.

If step S165 determines that the activation signal is not present, step S175 checks if a shut-down condition is met so that the method is ended with step S180. We have chosen Ignition OFF in step S175.

Figure 7:
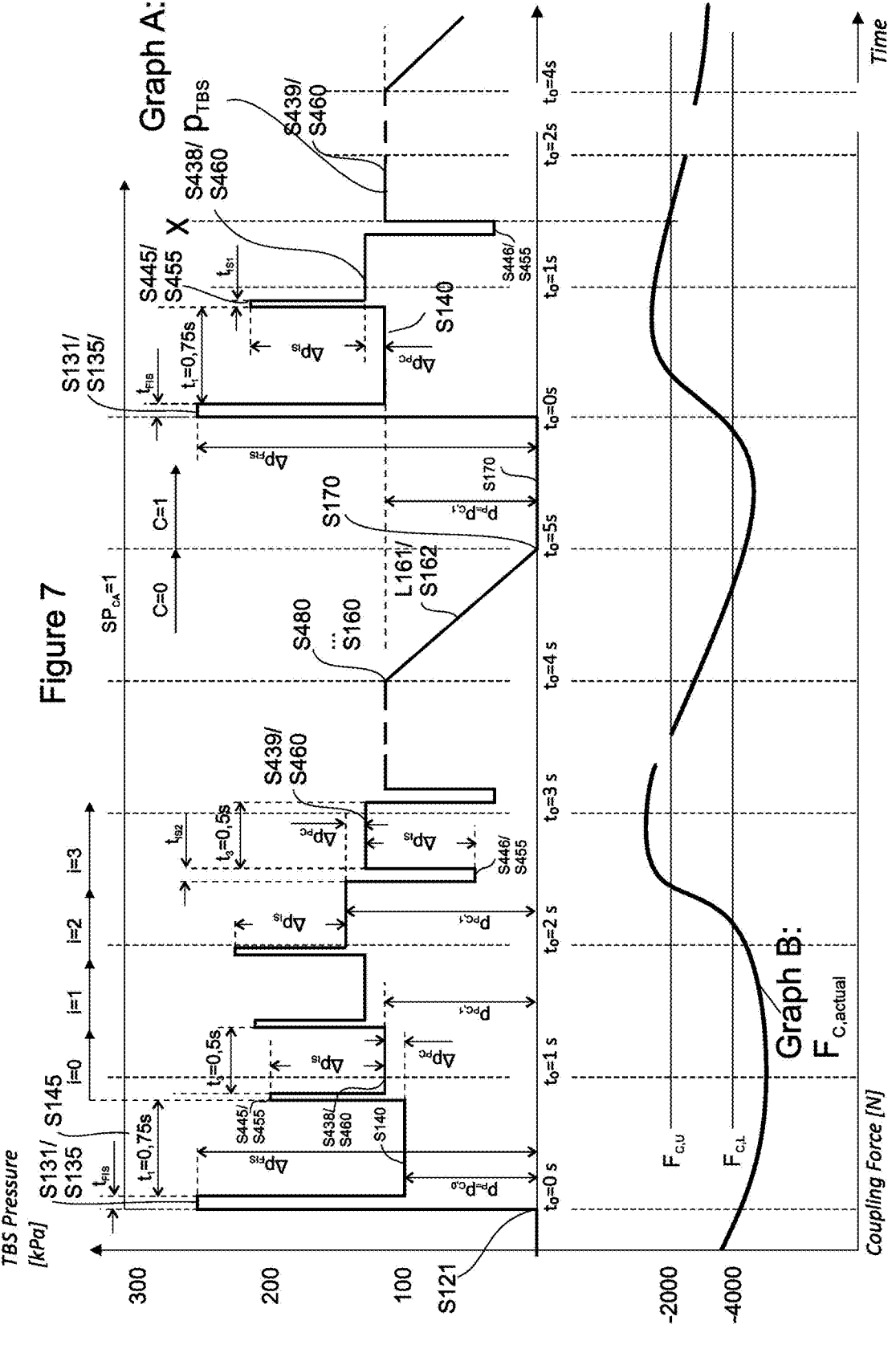
FIG. 7 is a characteristic map showing the results of method to control the trailer brake control signal (TBS) according to the invention.

FIG. 7 briefly depicts the results of the method according the invention.

The horizontal axis depicts the time in which the method proceeds.

The vertical axis is shows two portions:

The upper portion depicts the trailer brake signal TBS with pressure $P_{TBS}$

The lower portion depicts the measured coupling force $F_{C,actual}$ as determined with step S300 including the coupling force band defined by $F_{C,U}$ and $F_{C,L}$ whereby $F_{C,U}=-2000$ Newton and $F_{C,L}=-4000$ Newton. The graph B of the measured coupling force $F_{C,actual}$ is smoothened as with the cycle time of 50 ms the curve would show permanent oscillations As best seen with graph A the timer value for to is set to zero at step S121. As this is the first brake interval with C=0, step S131 determines the Pressure value $P_{FIS}$ of the First-In-Shot which is then generated at step S135. During the waiting period in step S145, the Pilot pressure $P_P$ is kept. Then the process proceeds to step S400.

Based on the actual pressure, the In-Shot with $p_{IS}$ is applied with step S455 based on the determination in steps S438, S445, S450. Then, in step S460, the controller pressure $P_{PC}$ is generated based on the determination in step S438. The steps S438, S445, S450 deliver an positive pressure increase as the coupling force $F_{C,actual}$ is below $F_{C,L}$. This is repeated until the coupling force $F_{C,actual}$ is above the $F_{C,L}$. Then a negative pressure increase is determined in steps S439, S446, S450 for generating the in-shot $p_{IS}$ in S455 and the controller pressure $P_{PC}$ in step 460.

This is provided until in step S480, timer $t_0$ reaches 4 s and the 3-point-controller is aborted. Next, the trailer brake signal TBS and pressure $p_{TBS}$ is ramped down in steps L161/s162. After 5 s (overall, or 1 s of down ramping) the pressure $p_{TBS}$ is to zero. A waiting period of 1 s is then applied with step S170.

If the activation signal is kept alive, the process starts again with the next brake interval (c=1), but then starts with the pressure value form previous interval $P_{PC,1}$ through step S132 and applies First-in-Shot, In-shot and Pressure control as described before.

At the time indicated with dotted line X the coupling force $F_{C,actual}$ is in the coupling force band so that the trailer brake signal TBS and pressure $p_{TBS}$ remains unchanged until the 4 s are reached again and ramping down starts.

A further embodiment of the invention relates to the generation of warning messages provided to the driver which may include further embodiments of the invention provided to detect if the trailer is attached, and moreover, for trailers provided with a brake system, determining the temperature of the trailer brake system.

With reference to FIG. 2 the process branches off to proceed sub process S500 in parallel, e.g. to sub process S300.

Figure 8:
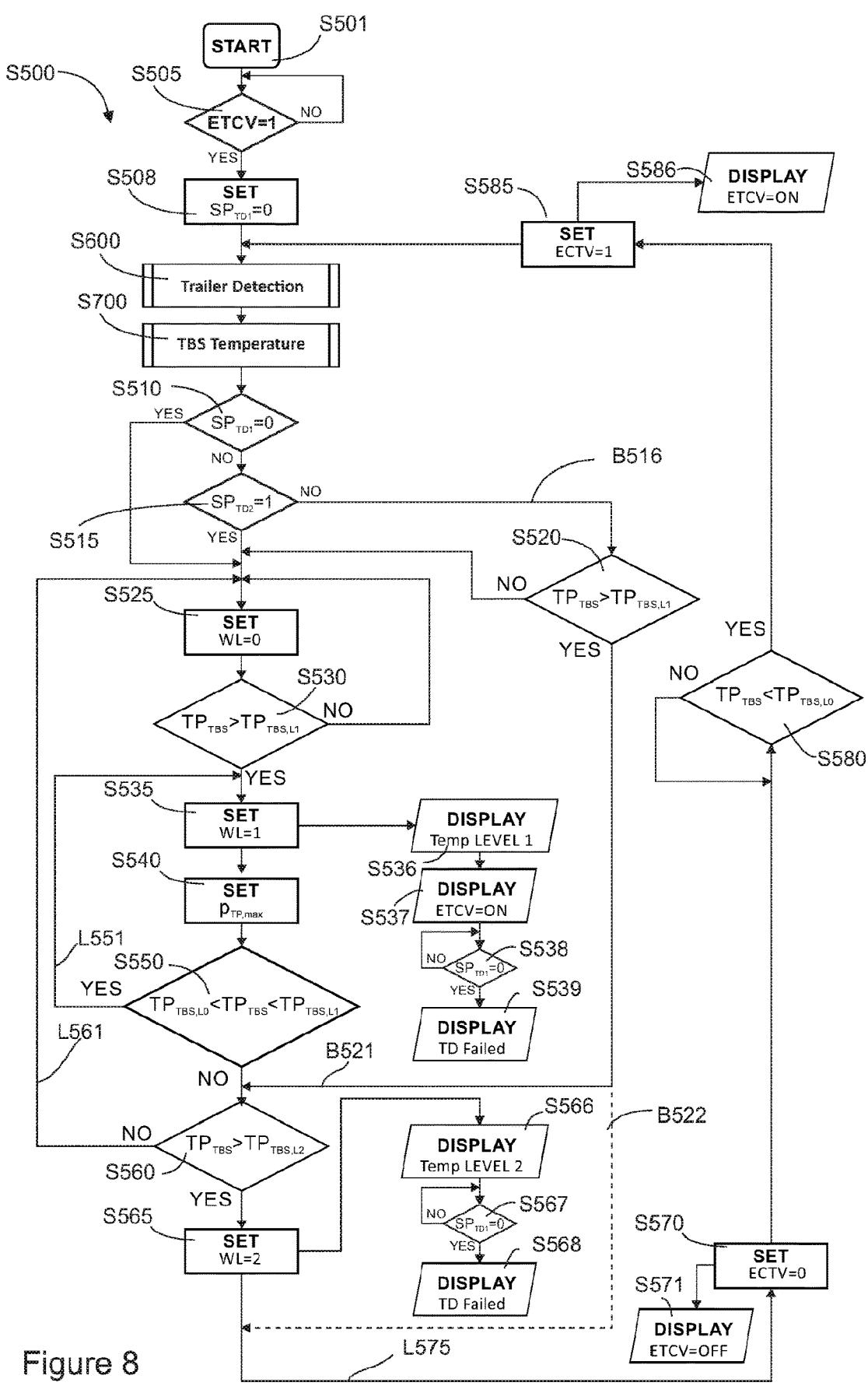
FIGS. 8, 9, 10 are flow charts showing process steps of methods according further embodiments of the invention, FIG. 11A/11B are flow charts depicting the process steps as shown in FIG. 5 but added with process steps of methods according further embodiments of the invention.

With reference to FIG. 8, sub process S500 is provided to generate warning messages on HMI terminal 75. Alternatively, the information may be indicated to the driver via an audio means or any other suitable means.

Sub process S500 starts with step S501 and proceeds further with step 505 to check if the electronic trailer brake function is activated (with ETCV=1). Preferably, the electronic trailer brake function is always activated during operation, e.g. when ignition is ON and/or the electronic vehicle control unit ECU is energized.

In Step S508 the process initially sets the parameter $SP_{DT1}$ to 0 as a default condition. The parameter $SP_{DT1}$ is a status parameter indicating that the detection of the trailer in sub process S600 was proceeded correctly as explained below. As this has not been provided at that stage, parameter $SP_{DT1}$ is set to 0 before sub process S600 starts. As explained below the provision of parameter $SP_{DT1}$ also enables the method to be processed without trailer detection.

The next step starts sub process S600 to provide the trailer detection and next sub process S700 to determine the trailer brake temperature. As indicated above, sub process S600 is an optional step.

Figure 9:
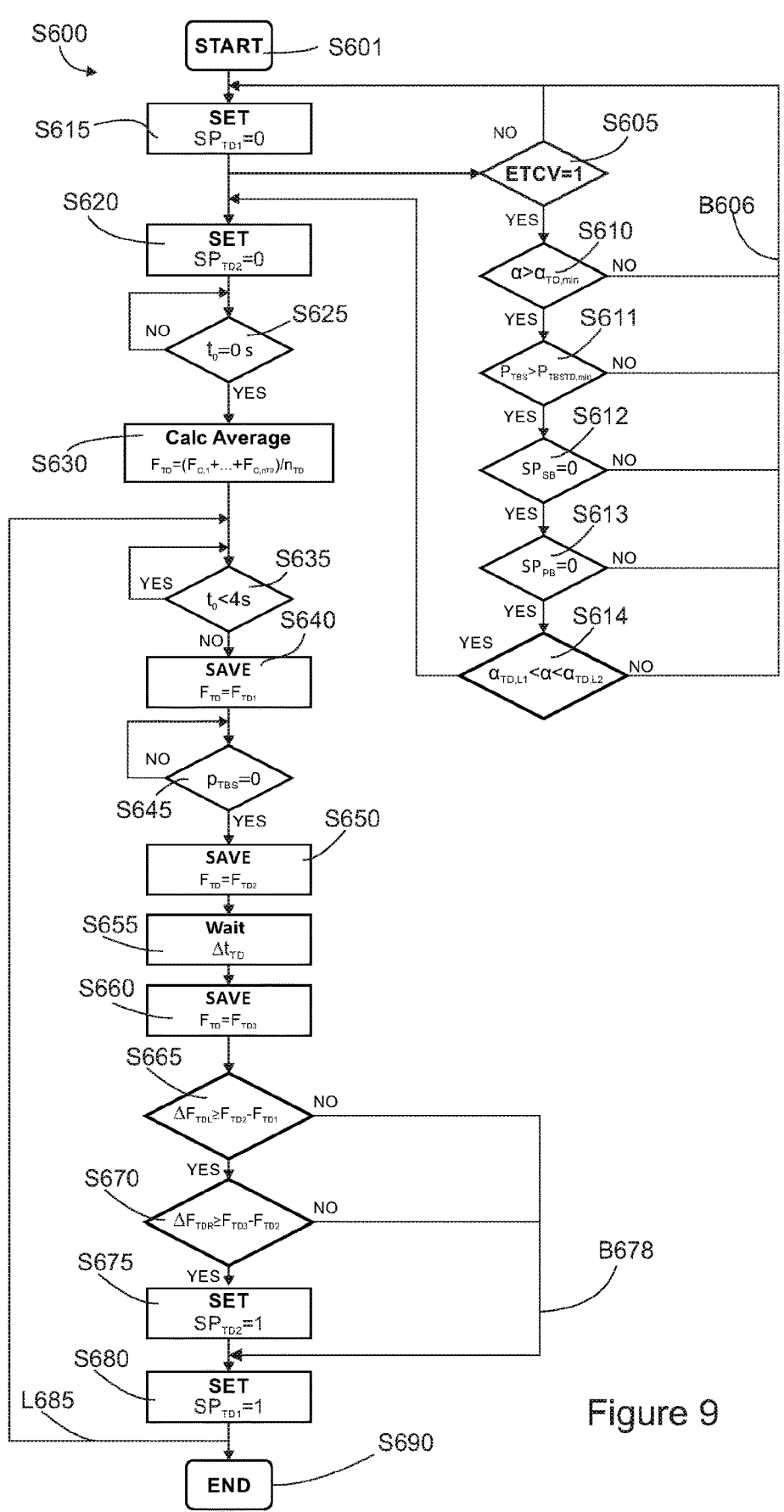

With reference to FIG. 9, sub process S600 is now explained in detail. Similar to step S508, step S615 sets the parameter $SP_{DT1}$ to 0 to provide a default condition. The process then branches to step S605 in which the activation of the electronic trailer brake function is checked, if not active (ETCV=0) the process returns prior to step S615, If the electronic trailer brake function is active (ETCV=1) the steps S610 to S614 serve to check further parameters which are explained below, whereby the order may be changed:

In step S610 the process checks if the vehicle is driving on a slope. If the current inclination $\alpha$ is greater than inclination $\alpha_{TD,min}$ (which may be about 3°) the process proceeds with next parameter, if the current inclination a is below, process returns to returns prior to step S615.

In step S611 the process checks if the trailer brake pressure $p_{TBS}$ stored in step S150 (shown in FIG. 2) is greater than $P_{TBSTD,min}$ (which may be about 80 kPA). If YES, the process proceeds with next parameter, if the current trailer brake pressure $p_{TBS}$ is below $p_{TBSTD,min}$, the process returns to returns to step S615. This step serves to check if the last stored and applied trailer brake signal was above a level which results in that the trailer brake supplies a brake effort. Tests have shown, that below $p_{TBSTD,min}$ the signal does not result in effective braking of the trailer but only results in that that the brake lines are filled or the brake actuators move to slightly contact the brake discs.

In step S612 the process checks if the service brake of the tractor is not activated ($SP_{SB}$=0). If YES, the process proceeds with next parameter, if NO ($SP_{SB}$=1) the process returns to returns to step S615. Any activation of the service brake would overwrite electronic trailer braking provisions mentioned above.

In step S613 the process checks if the park brake of the tractor is not activated ($SP_{PB}$=0). If YES, the process proceeds with next parameter, if NO ($SP_{PB}$=1) the process returns to returns to step S615. Any activation of the park brake would overwrite electronic trailer braking provisions mentioned above.

In step S614 the process checks if the current inclination a remains within an inclination band by lower value $\alpha_{TD,L1}$ say 3°, and upper value $\alpha_{TD,L2}$ say 20°. If YES, the process proceeds with step S620, if NO the process returns to returns to step S615. In other words, the vehicle must remain on the slope during trailer detection.

It is envisaged that the parameters $\alpha_{TD,min}$, $p_{TBSTD,min}$, $\alpha_{TD,L1}$, $\alpha_{TD,L2}$ used for these comparisons and also status parameters $SP_{SB}$ and $SP_{PB}$ may be stored in the ECU and may vary for different vehicle configurations. Some of the conditions may be used optionally.

If conditions are not met, process returns to returns to step S615 so that the parameter $SP_{DT1}$ remains 0 for usage in other processes, especially S500. This means that the trailer detection failed.

If all conditions are met, step S620 sets the parameter $SP_{DT2}$=0 to provide the default condition. The parameter $SP_{DT2}$ is a status parameter indicating that a trailer was detected ($SP_{DT2}$=1) or if the tractor is operated without trailer ($SP_{DT2}$=0) and is explained below in detail.

In step S625 the process includes a timer loop which waits until the first timer value to is also set to zero (seconds) in STEP S121 to start the timer for the brake interval. Briefly described, step S625 enables that the subsequent process is processed in parallel to the steps following step S121 in main process M100 to define the brake interval as described in FIG. 2. Alternatively, the brake interval counter c as described in FIG. 2 may be used to determine the duration of the brake interval.

In step S630, the process determines an average coupling force value $F_{DT}$ within a predetermined number of cycles $n_{TD}$ based on the permanent determination of the coupling force $F_{C, actual}$ as described with step S300 in FIG. 3. This parameter is used to detect the presence of the trailer as described below.

In step S635, the process includes a further timer loop which waits until the first timer value to reaches 4 seconds. As described in the main process M100 (FIG. 2) and S400, if the timer value is 4 seconds, the trailer brake pressure signal $F_{TBS}$ is ramped down in steps S160, S162.

Step S640 saves a first averaged coupling force value $F_{TD1}$ determined based on step S630. Further details are described below.

In Step S645 the process waits until trailer brake pressure signal $F_{TBS}$ is ramped down to $F_{TBS}$=0 with steps S160/S162.

With the trailer brake pressure signal $F_{TBS}$=0, step S650 saves a second averaged coupling force value $F_{TD2}$ determined based on step S630. Further details are described below.

In step S655 the process waits for an time offset $\Delta t_{TD}$=0.5 seconds. At this time, the trailer brake pressure signal $F_{TBS}$ is increased again with the next brake interval (indicated with c).

Step S660 saves a third averaged coupling force value $F_{TD3}$ determined based on step S630.

The values of the first, second and third average coupling force values $F_{TD1}$, $F_{TD2}$, $F_{TD2}$, in steps S640, S650 and S660 now enable the electronic vehicle control unit ECU to determine parameters of the trailer detection according a further aspect of the invention in step S665 and S670 which is now explained in more detail with reference to FIG. 12.

Figure 12:
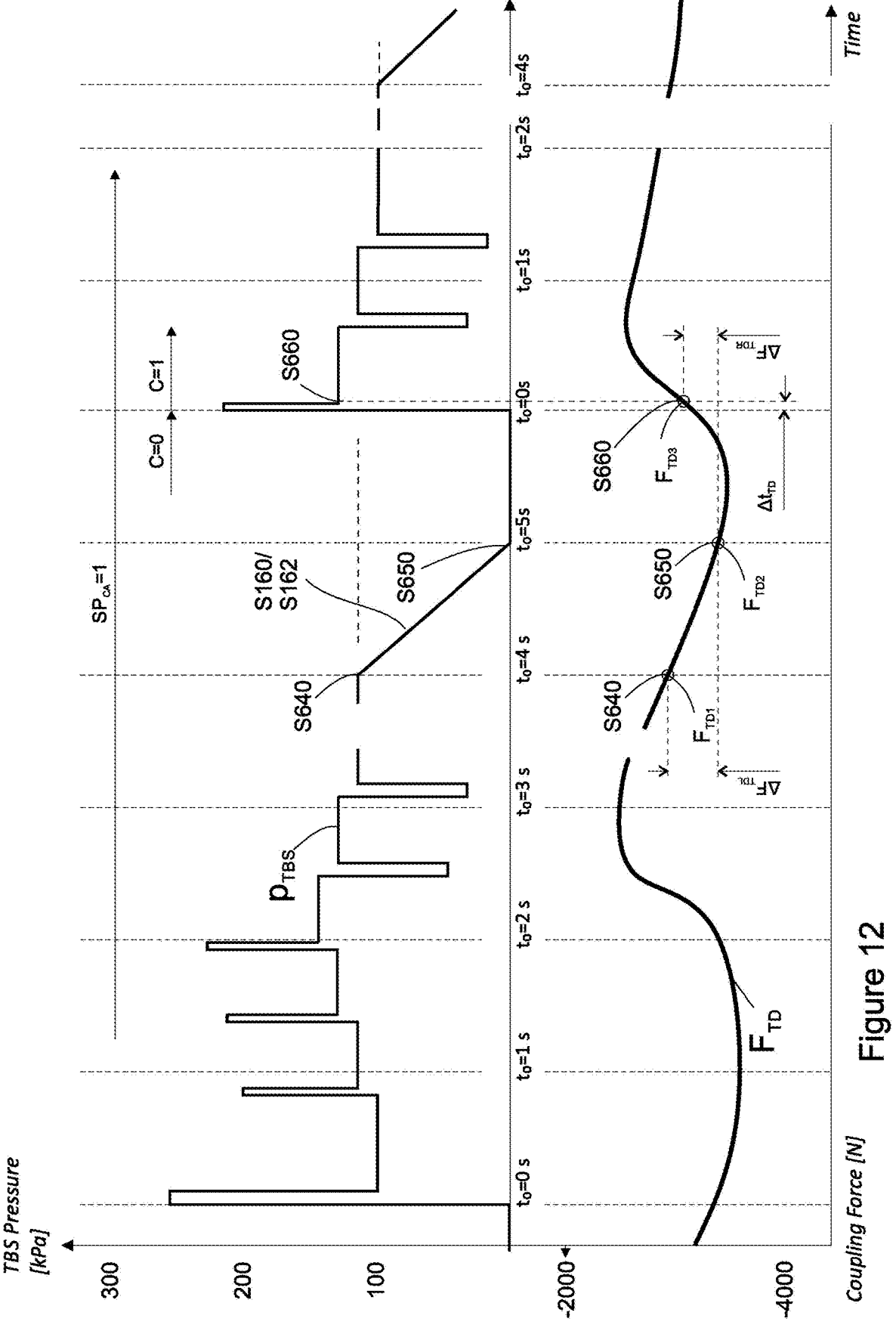
FIG. 12 is a chart illustrating pressure and coupling force as a function of time while performing the method of FIGS. 11A-11B.

FIG. 12 briefly depicts the time in which the method proceeds in the horizontal axis.

The vertical axis is shows two portions:

The upper portion depicts the trailer brake signal TBS with pressure $p_{TBS}$

The lower portion depicts the averaged coupling force $F_{TD}$ as determined with step S630. The graph B of the averaged coupling force $F_{TD}$ In step S665 the process checks the subtraction $F_{TD2}$−$F_{TD1}$ is greater than a first difference value $\Delta F_{TDL}$ stored in the ECU, which is assigned to a reduction of the trailer brake pressure. With reference to FIG. 12, this is done to check if the ramp down of the pressure during step S160/162 (described with FIG. 2) results in a significant change in the coupling force when considering that the force applied by the trailer to the tractor is of negative sign. If no trailer with a trailer brake system is attached, the release of the trailer brake would not impact the coupling force. If a trailer with a trailer brake system is attached (and the conditions as described in steps S610 to S614 are met) the coupling force increases in negative sign direction as the trailer pushes the tractor without trailer braking. In the shown embodiment, $F_{TD1}$ is about −3000 N and $F_{TD2}$ is about −3500 N. As the predetermined value for $\Delta F_{TDL}$=−300 N, the subtraction $F_{TD2}$−$F_{TD1}$ would result in −500 N being greater than the first difference value $\Delta F_{TDL}$ in negative sign direction. With the condition of step S665 being met, process moves to next step S670. If not met, process moves to prior to step S680 explained below.

In step S670 the process checks the subtraction $F_{TD3}$−$F_{TD2}$ is greater than a second difference value $\Delta F_{TDL}$ stored in the ECU, which is assigned to an increase of the trailer brake pressure. With reference to FIG. 12, this is done to check if raising the trailer brake pressure in the next brake interval starting with steps S460 in (described with FIG. 5, 11A, 11B) results in a significant change in the coupling force when considering that the force applied by the trailer to the tractor is of negative sign. If no trailer with a trailer brake system is attached, the increase of the trailer brake pressure would not impact the coupling force. If a trailer with a trailer brake system is attached (and the conditions as described in steps S610 to S614 are met) the coupling force would decrease in negative sign direction as the trailer tractor combination is stretched reducing pushing effect. In the shown embodiment, $F_{TD3}$ is about −3200 N and $F_{TD2}$ is about −3500 N. As the predetermined value for $\Delta F_{TDR}$=200 N, the subtraction $F_{TD3}$−$F_{TD2}$ would result in 300 N being greater than the second difference value $\Delta F_{TDR}$. With the condition of step S665 being met, process moves to next step S670. If not met, process moves to prior to step S680 explained below.

If the conditions defined in steps S670 and S675 are met, the process approaches to step S675 in which the parameter $SP_{DT2}$ is set to 1 indicating that a trailer was detected.

If the conditions defined in steps S670 and S675 are not met, steps S670 and S675 approach to step S680 in which the parameter $SP_{DT2}$ is set to 0 indicating that tractor is operated without a trailer.

Compared to the parameter $SP_{DT2}$, the parameter $SP_{DT1}$ just states if the trailer connection failed or not in that parameter $SP_{DT2}$ is set to 0 or 1. If not parameter $SP_{DT1}$ remains 0.

With loop L685, the process returns prior to step S635 to restart the coupling force determination to continually determine status parameters $SP_{DT1}$ and $SP_{DT2}$ and forward the results to other sub routines, especially the subroutine S500 in FIG. 8. Alternatively, the sub routine S600 may end with step S690 so that the status parameters $SP_{DT1}$ and $SP_{DT1}$ are only determined during two brake intervals. Sub process S600 may then be restarted with step S508 in sub routine S500.

Coming back to FIG. 8, sub process S500 then proceeds with further sub routine S700 which is provided to determine a trailer brake temperature.

Figure 10:
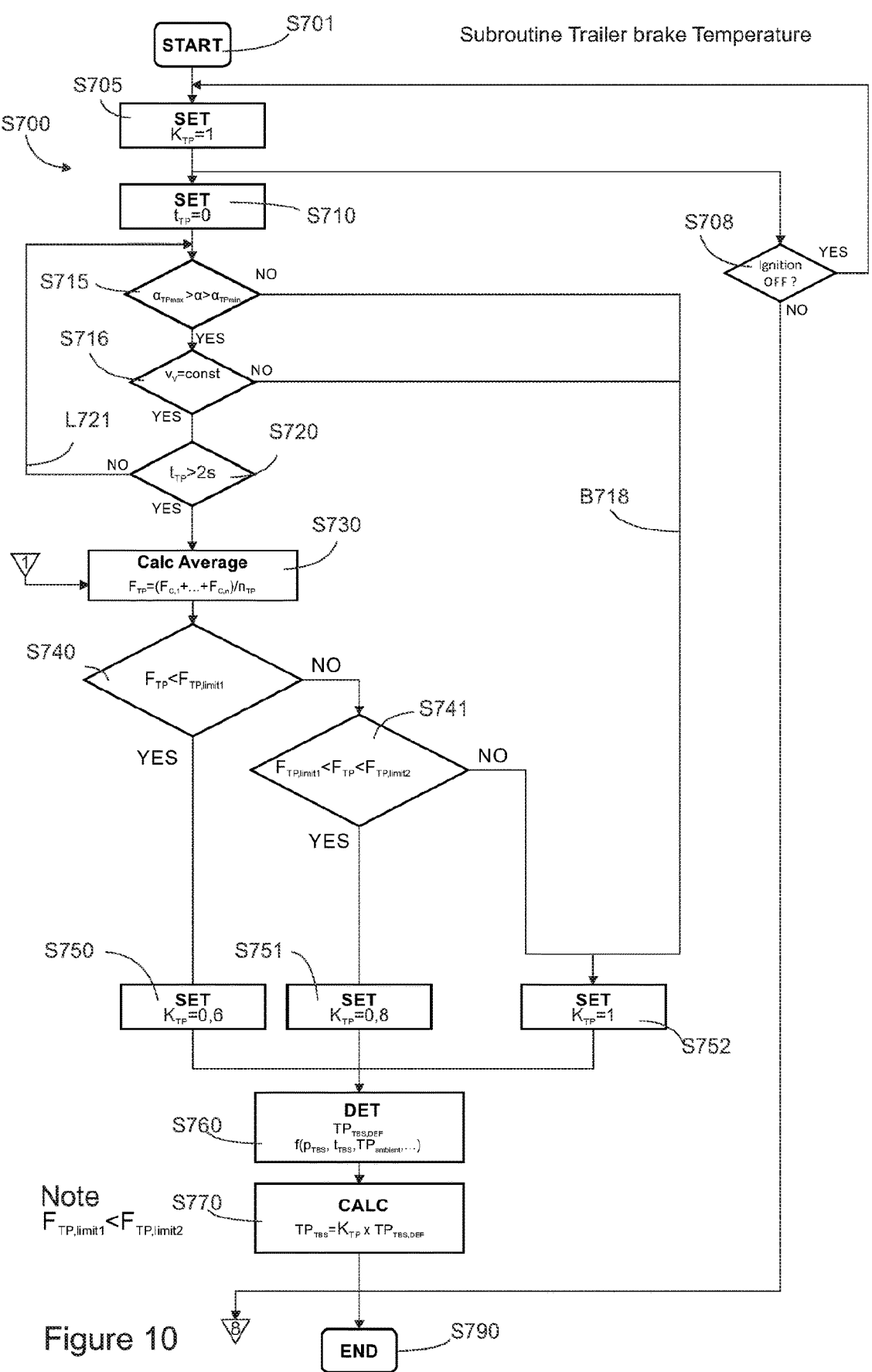

With reference to FIG. 10, sub routine S700 starts with step S701. In step S705, a temperature correction factor $K_{TP}$ is set to 0 as a default condition. Further details are explained below. in step S710, a time value $t_{TP}$ is set to 0. Further details are explained below.

The steps S715 and S716 are provided to check certain operating conditions:

Step S715 ensures that the vehicle is moving on relatively flat terrain with $\alpha_{TPmax} > \alpha > \alpha_{TPmin}$, whereby $\alpha TPmin=1°$ and $\alpha_{TPmax}=5°$ stored in the ECU as setting.

Step S716 ensures that the vehicle speed $v_V$ remains constant

If these conditions are met within the duration defined with step S720 and the time loop L721, e.g. 2 seconds, the process proceeds with step S752 explained below.

If these conditions are met within the duration defined with step S720 and the time loop L721, the process proceeds with step S730 to determine an average coupling force value $F_{TP}$ within a predetermined number of cycles $n_{TP}$ based on the permanent determination of the coupling force $F_{C, actual}$ as described with step S300 in FIG. 3. As the conditions defined in steps S715 and S716 mean that the vehicle combination is operated in a condition wherein the tractor pulls the trailer (no trailer brake activation) the average coupling force value $F_{TP}$ is determined in positive sign, which is important for the next steps, S740, S74, in which the average coupling force value $F_{TP}$ is used to provide a rough information on the weight of the trailer. As the trailer weight is one important factor impacting the trailer brake temperature during brake activation, average coupling force value $F_{TP}$ is taken to estimate trailer weight and set a temperature correction factor $K_{TP}$ accordingly as explained below:

If in step S740, the average coupling force value $F_{TP}$ is below a first limit value $F_{TP, limit1}$, e.g. 500 Newton, this would indicate that a light weight trailer is attached so that the temperature correction factor $K_{TP}$ is set to 0.6 in step S750.

If the condition in step S740 is not met, the process continues with to step S741.

If in step S741, the average coupling force value $F_{TP}$ is within a first limit value $F_{TP, limit1}$ and a second limit value $F_{TP, limit2}$ e.g. between 500 N and 1500 N, this would indicate that a medium weight trailer is attached so that the temperature correction factor $K_{TP}$ is set to 0.8 in step S751.

If step S740 or S741 are not met, the average coupling force value $F_{TP}$ must exceed second limit value $F_{TP, limit2}$ e.g. 1500 N, this would indicate that a heavy weight trailer is attached so that the temperature correction factor $K_{TP}$ is set to 1 in step S752. The temperature correction factor $K_{TP}$ is also set to 1 in step S752, if the conditions defined in step S715 and S716 are not met within the duration defined with step S720 and the time loop L721.

To summarise, depending on an average coupling force value $F_{TP}$ the steps starting with S730 provide an estimation of the vehicle weight, or more precise, assign three trailer weights light weight, medium weight, heavy weight depending on the average coupling force value $F_{TP}$ to set temperature correction factor $K_{TP}$.

This temperature correction factor $K_{TP}$ is used to adapt a trailer brake temperature $TP_{TBS,DEF}$.

Initially, step S760 determines a trailer brake temperature $TP_{TBS,DEF}$ using a temperature model. The temperature model may use parameters such as the trailer brake pressure $T_{TBS}$, the trailer brake duration $t_{TBS}$ (how long the trailer brake pressure is kept) and further parameters such as the ambient temperature $TP_{Ambient}$. Trailer brake pressure $T_{TBS}$ and the trailer brake duration $t_{TBS}$ may be determined during e.g. M100 or sub routine S400. The ambient temperature may be already available in the ECU, e.g. for HVAC control.

Thereby it is considered the fact that brakes (or clutches) tend to produce more heat with higher trailer brake pressure $T_{TBS}$ and longer trailer brake duration $t_{TBS}$. The same applies when the vehicle or trailer is operated in hot ambient conditions. A major drawback of this model is that the trailer weight is not included.

The temperature model is not explained in detail as this is known form many applications for brakes, but also for clutches in vehicles or stationary applications.

In step S770, the process calculates the trailer brake temperature $TP_{TBS}$ by multiplication of $TP_{TBS,DEF}$ with temperature correction factor $K_{TP}$.

Sub Routine may end with step S790.

To summarise, process S700 estimates the trailer weight based on the (average) coupling force during pull operation and corrects the brake temperature (determined by a known temperature model) so that the subroutine delivers a lower trailer brake temperature $TP_{TBS}$ for a light weight trailer (as the heat impact is lower when the weight is smaller) and higher trailer brake temperature $TP_{TBS}$ for a medium or heavy weight trailer (as heat impact increases with trailer weight). As the trailer brake temperature $TP_{TBS}$ is further used to generate temperature warning to the driver, the process has the major advantage that the trailer brake temperature is considering trailer weight.

Coming back to FIG. 8 and sub routine S500, with the parameters of the trailer detection and the trailer brake temperature determined, Sub routine S500 proceeds to generate warning messages as explained below:

In step S510, the process checks of the trailer detection failed. If YES, the process commences with step S525. If the trailer detection was processed correctly, step S515 checks if a trailer is attached or the tractor ($SP_{TD2}=1$) is operated without trailer.

If the condition $SP_{TD2}=1$ is met, the process commences with step S525 to set a warning level parameter WL to 0 as default. Thus default value represents a condition in which the trailer brakes are at a level which do not require to impact the method described herein.

In step S530 the process checks if the trailer brake temperature $TP_{TBS}$ determined in subroutine S700 exceed a first temperature $limit_{TBS,L1}$. If NO, a loop returns the process prior to step S525. In other words, the process waits until first temperature limit$_{TBS,L1}$ is exceeded before further processing.

Figures 13A, 13B, 13C, 13D:
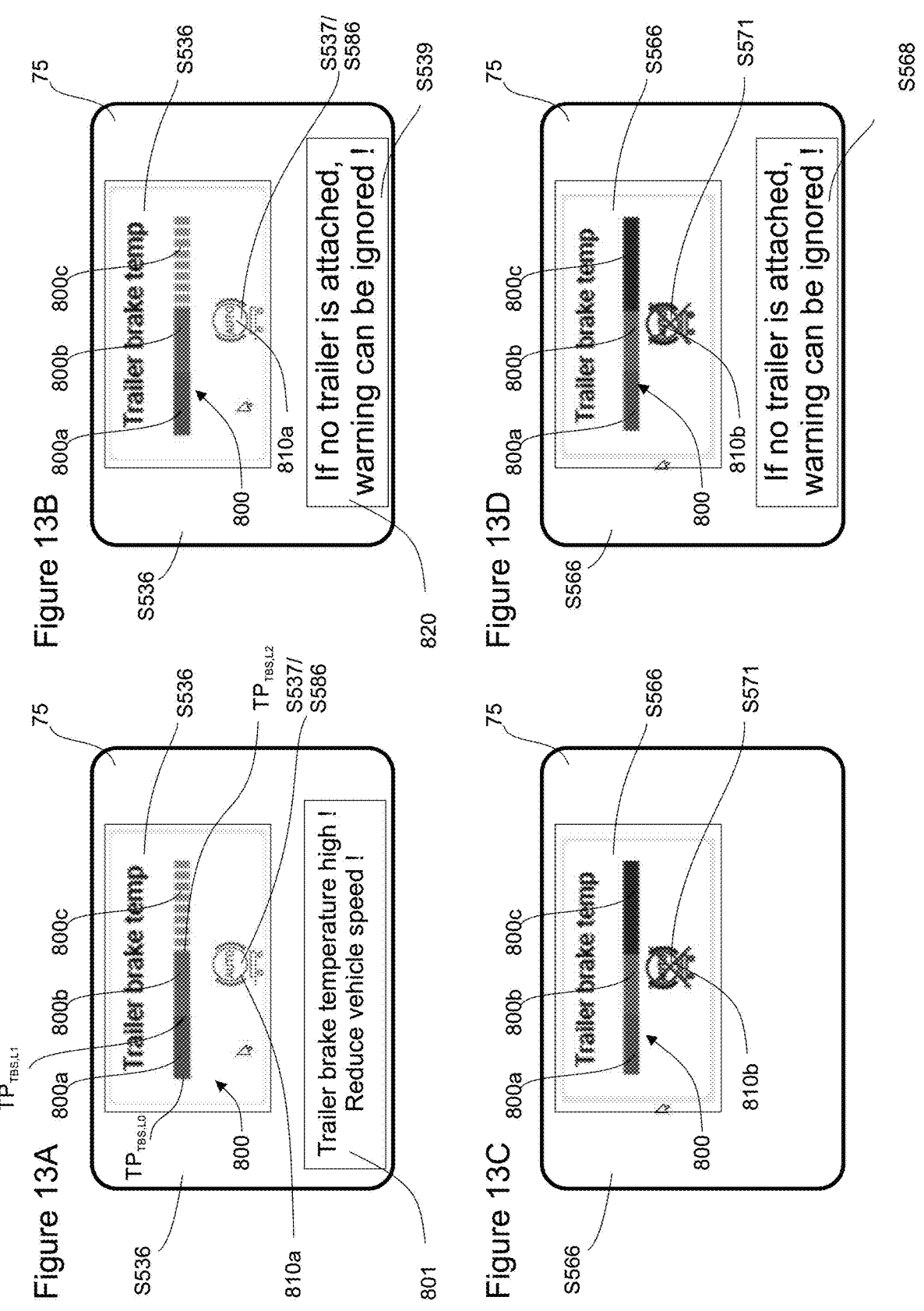
FIG. 13A, 13B, 13c, 13d show simplified representations of the graphical warning messages according further embodiments of the invention.

If the condition is met, step S535 sets warning level parameter WL to 1 which indicates that a first warning level is reached. As a result step S536 generates a first temperature message (temperature LEVEL 1) shown the HMI terminal 75 as depicted in FIG. 13A. The message includes a temperature bar display 800 representing trailer brake temperature TP$_{TBS}$ in a graphical format. Temperature bar display 800 contains three coloured partitions:

A portion 800$a$ representing a trailer brake temperature TP$_{TBS}$ below TP$_{TBS}$, L1 (WL=0) depicted in GREEN colour.

A portion 800$b$ representing a trailer brake temperature TP$_{TBS}$ in a range between TP$_{TBS, L1}$ and TP$_{TBS, L2}$ (WL=1) depicted in ORANGE colour then.

A portion 800$c$ representing a trailer brake temperature TP$_{TBS}$ exceeding TP$_{TBS, L2}$ (WL=2) depicted in RED colour. Portion 800$c$ is greyed out in step S536.

Furthermore a warning message 801 is generated to prompt the driver that the trailer brake temperature is high and recommend to reduce vehicle speed. In combination with first temperature message, step S537 shows the status of the electronic trailer braking including a symbol 810$a$ indicating that the electronic trailer braking remains activated.

If the trailer detection has failed as checked in step S537 (with SP$_{TD1}$=0) an additional message 820 would be generated in step S539 as depicted in FIG. 13B to inform the driver that the trailer detection failed. Warning message 801 as depicted in FIG. 13$a$ may be appear alternatingly.

In parallel step S540 sets a pressure limit value p$_{TBS,max}$ to a predetermined value stored in the ECU. This pressure value is used to limit the trailer brake pressure signal p$_{TBS}$ as explained lateron with FIG. 11A, 11B.

In next step S550 the process checks if the trailer brake temperature TP$_{TBS}$ remains in a range between TP$_{TBS, L0}$ and TP$_{TBS, L1}$. This means that warning level parameter WL=1 remains unaltered. If YES, the process returns via loop L551 prior to step S535.

Before going further, the previously described process was described for the parameter SP$_{TD2}$=1 with a trailer detected. If in step S515 is SP$_{TD2}$=0 the tractor is operated without trailer and commences with branch B516 to step S520. Step S520 is provided to check (similar to step S530) if the trailer brake temperature TP$_{TBS}$ exceed a first temperature limit$_{TBS,L1}$. If NO, a loop returns the process prior to step S525. If the condition is met, the process follows branch B521 to step 560. In other words, the process skips the temperature warning LEVEL 1 initiated by the warning level parameter WL=1 and instead initiate next temperature warning LEVEL 2. This has the major advantages, that when the status of the trailer detection indicates that the tractor is operated without a trailer, a warning level is generated only when the temperature exceeds a higher level so that the driver may check if a trailer is attached without being detected. This may be improve safety but avoid showing to many warnings.

Alternatively, the process may commence after step S520 by following alternative branch B522 to deactivate electronic trailer braking as explained with step S570.

In step S560 the process checks if trailer brake temperature TP$_{TBS}$ exceeds TP$_{TBS, L2}$. If NO, the process returns via loop L561 prior to step S525. If YES, next temperature level is reached and warning level parameter WL set to 2 in step S565.

As a result step S566 generates a second temperature message (temperature LEVEL 2) shown the HMI terminal 75 as depicted in FIG. 13$c$. The message includes a temperature bar display 800 representing trailer brake temperature TP$_{TBS}$ in a graphical format. Temperature bar display 800 contains three coloured partitions:

A portion 800$a$ representing a trailer brake temperature TP$_{TBS}$ below TP$_{TBS}$, L1 (WL=0) depicted in GREEN colour.

A portion 800$b$ representing a trailer brake temperature TP$_{TBS}$ in a range between TP$_{TBS, L1}$ and TP$_{TBS, L2}$ (WL=1) depicted in ORANGE colour.

A portion 800$c$ representing a trailer brake temperature TP$_{TBS}$ exceeding TP$_{TBS, L2}$ (WL=2) depicted in RED colour.

If the trailer detection has failed as checked in step S567 (with SP$_{TD1}$=0) an additional message 820 would be generated in step S568 as depicted in FIG. 13D to inform the driver that the trailer detection failed.

In step S570 the electronic trailer braking is deactivated by setting the ETCV=0 so that a message is generated in step S571 shown a symbol 810$b$ indicating that the electronic trailer braking is deactivated.

With the process further approaches along branch L575 step S580 checks if trailer brake temperature TP$_{TBS}$ falls below TP$_{TBS, L0}$. TP$_{TBS, L0}$ is a temperature level which indicates that the brakes have cooled down sufficiently after exceeding the previous temperature values. If NO, the process returns via loop to wait until the condition is met. If YES, the process approaches to step S585 in which the electronic trailer braking is activated (again) and the symbol 810$a$ (similar to FIG. 13A) is shown again. The process then returns prior to step S600.

Regarding the temperature limits, the values are depicted in FIG. 13A whereby TP$_{TBS, L0}$<TP$_{TBS, L1}$<TP$_{TBS, L2}$.

The above described messages may be confirmed by the driver to disappear. Alternatively, the messages may disappear after a certain time. More alternatively, the messages may be shown in large scale on the HMI 75 and reduced to a smaller size after a certain time period. Instead of an optical message, the message may be provided by voice or any other suitable means having the attention of the driver.

To summarise, sub routine step S500 is designed to provide a two stage temperature warning when the trailer detection has worked properly and an attached trailer with a trailer brake system is detected. In addition, for the case that the trailer detection failed, the two stage temperature warning is kept, but the driver is additionally prompted to check if a trailer is attached. This may point the attention to the driver that he has to regularly check trailer brake temperatures or monitor if brake fading occurs as the described process is not able to dependably provide this important information.

When the trailer detection has been processed successfully and the trailer detection indicates that the tractor is operated without trailer, the process skips first warning level. Even if there may be no trailer, the driver is still informed, but only at higher trailer brake temperatures to make sure that if the detection was wrong in any other way the driver is informed in this case of high brake temperature levels. E.g. if a trailer with trailer brake system is attached, but the trailer brake system is not correctly connected to the tractor so that the trailer brake signal p$_{TBS}$ is not correctly forwarded to the trailer to initiate braking, the driver is pointed to that problem and can check the connection.

As already indicated in the preceding description the temperature monitoring and warning process also influence the trailer brake signal $p_{TBS}$ which is now described with reference to FIGS. 2, 8, 11A, 11B, 12A and 12B.

Figure 11A:
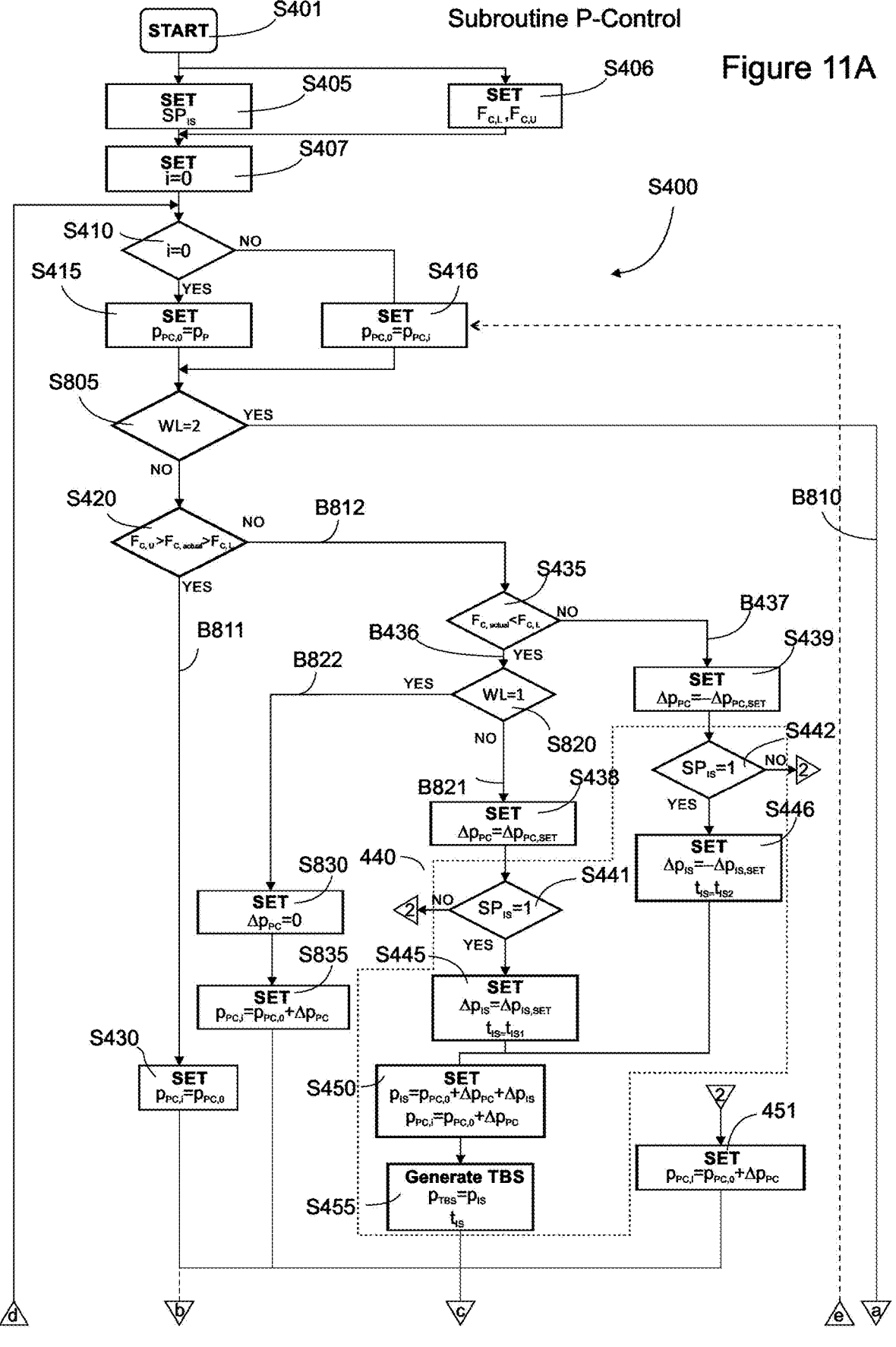
Figure 11B:
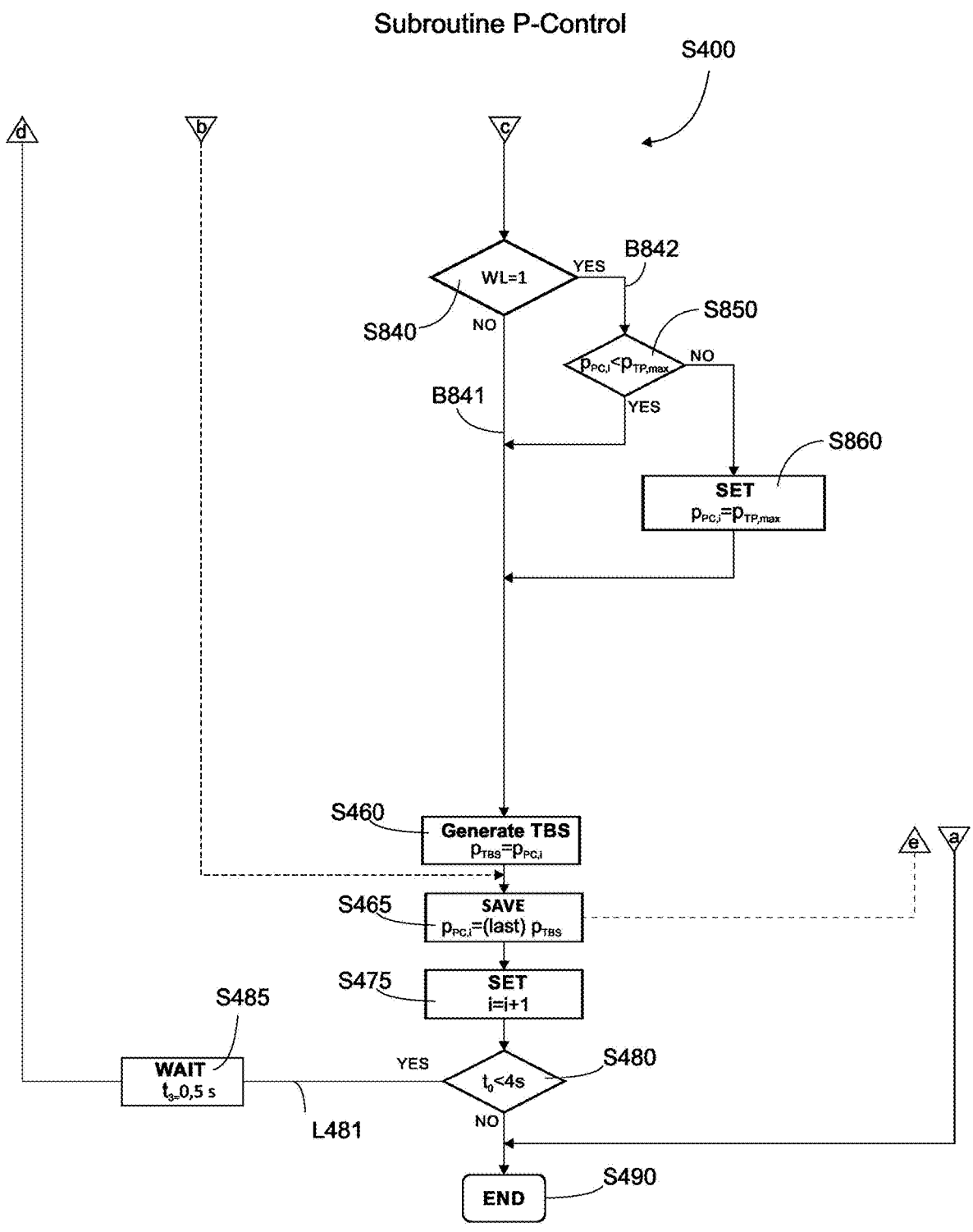

FIGS. 11A and 11B is similar to FIG. 5 but split into two portions for clarity reasons. Where the same elements and references are used as in FIG. 5, these are not described again. The flow chart depicted in FIGS. 11A and 11*b* are provided with triangular transition markers a, b, c, d and e to emphasize how the process of FIG. 11A and FIG. 11B is connected.

Figure 14A:
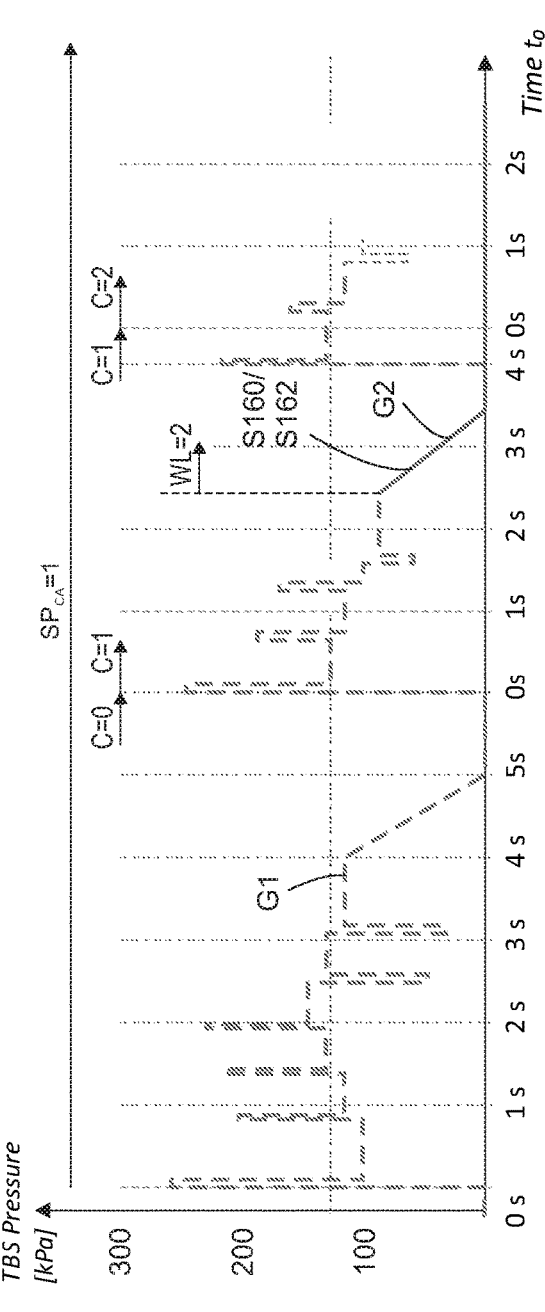
FIG. 14A, 14B are characteristic maps showing the results of method according further embodiments of the invention.

As described in FIG. 8, the step S535 sets warning level parameter WL=1 and step S540 sets a pressure limit value $p_{TBS,max}$ at a first temperature LEVEL 1. Furthermore, step S565 sets warning level parameter WL=2 when a second temperature LEVEL 2 is reached. The parameters WL and $p_{TBS,max}$ are used in sub routine S400 depicted in FIGS. 11A and 11B to control the trailer brake signal $p_{TBS}$ as described in the following:

In step S805 the subroutine S400 checks if temperature level is at LEVEL 2. If YES, the process skips to the end at step S490. This will, with reference to FIG. 2, result in that step S160 and S162 ramp down the pressure to $p_{TBS}$=0. In other words, when very high temperatures are reached, the trailer brake is brought into a condition where the brakes are not operated so that they may cool down. This is schematically depicted with FIG. 14A wherein the time in which the method proceeds is depicted in the horizontal axis and the vertical axis shows the trailer brake signal TBS with pressure $p_{TBS}$. The dotted line graph G1 represent the trailer brake signal $p_{TBS}$ for the case that warning level parameter WL=0, so no critical temperature indicating temperature LEVEL 1 or LEVEL 2 is reached. While solid line graph G2 represents the trailer brake signal TBS when temperature LEVEL 2 (WL=2) is reached.

If the temperature LEVEL 2 (WL=2) is not reached, process commences with step S420 to start the trailer brake signal generation depending on coupling force as previously described in FIG. 5. If condition in step S420 is met the branch B811 with step S430 remains as described in FIG. 5 and is therefore not described further. If NO, branch B812 is proceeded with step S435.

If step S435 is not met, meaning that the actual coupling force $F_{C, actual}$ exceeds the upper coupling force $F_{C,U}$, branch B437 and step S439 is proceeded as described in FIG. 5 and not described further. In other words, the controller pressure $p_{PC,i}$ can still be reduced as described in step S439, S442, S446.

If the actual coupling force $F_{C, actual}$ undercuts the lower coupling force $F_{C,L}$ as checked in step S435, branch B436 is proceeded. As in the process described in FIG. 5, this may initially result in an increase of controller pressure $p_{PC,i}$, but step S820 first checks if temperature LEVEL 1 (WL=1) is reached. If NO, the process proceeds with branch B 821 and step S438 to increase the trailer brake pressure signal $p_{TBS}$ as described in FIG. 5 and therefore not described further.

If step S820 determines that temperature LEVEL 1 (WL=1) is reached the method proceeds with branch B822 to step S830 to set the pressure increase $\Delta p_{TP}$ to 0. This results in that the $p_{C,I}$ is not increased further in step S835.

With reference to FIG. 11B the process then passes further via transition marker c to step S840 where the method checks if temperature LEVEL 1 (WL=1) is reached. If temperature LEVEL 1 (WL=1) is not reached, branch B841 is processed to generate a trailer brake signal $p_{TBS}$=$p_{C,i}$ in step S460. If temperature LEVEL 1 (WL=1) is reached, the process checks in step S850 if the trailer brake pressure signal $p_{C,I}$ is below pressure limit $p_{TP, max}$. If NO, the trailer brake pressure signal $p_{C,I}$ is set to $p_{TP, max}$ in step S860 and then proceeds back to branch B841 and step 460 to generate a trailer brake signal $P_{TBS}$=$p_{C,I}$=$p_{TP, max}$ If YES the process returns to branch B841 to generate a trailer brake signal $p_{TBS}$=$p_{C,i}$ in step S460 without limitation of the brake pressure. Steps S840, S850 and S860 serve to enable the process to keep trailer brake pressure signal $p_{C,I}$ (determined in a previous controller interval i) constant, but if the trailer brake pressure signal $p_{C,I}$ once falls below pressure limit $p_{TP, max}$ the limit is not exceeded as long as the activation of the electronic trailer brake is active with $SP_{CA}$=1.

Figure 14B:
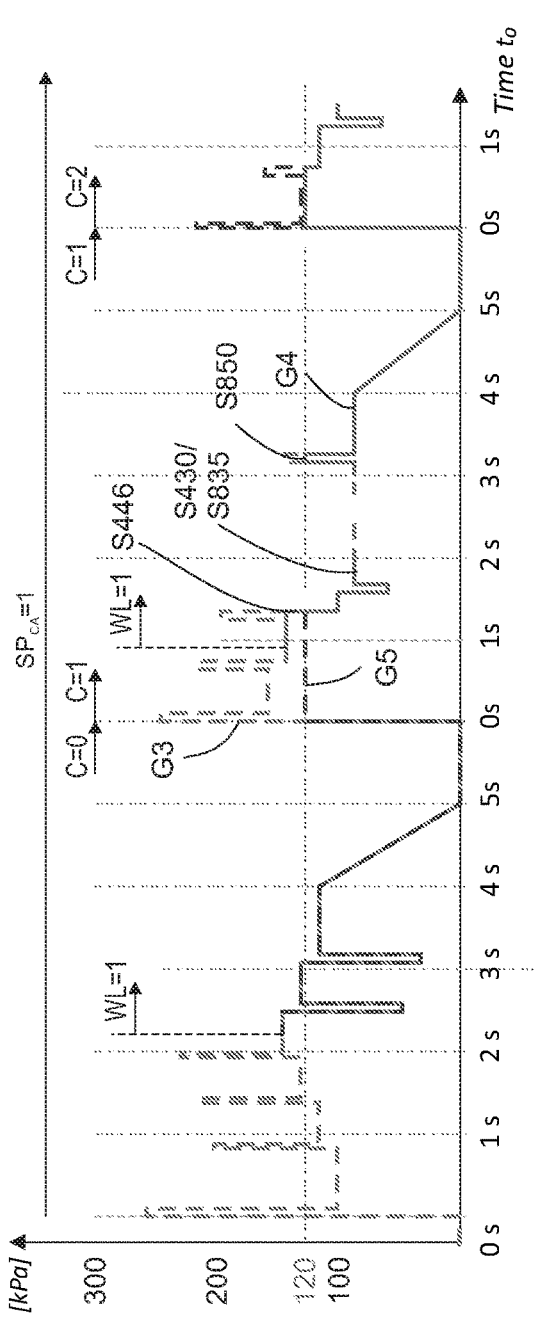

The result of the process can be best seen in FIG. 14B wherein the time in which the method proceeds is depicted in the horizontal axis and the vertical axis shows the trailer brake signal TBS with pressure $P_{TBS}$. The dotted line graph G3 represent the trailer brake signal $p_{TBS}$ for the case that warning level parameter WL =0, so no critical temperature indicating temperature LEVEL 1 or LEVEL 2 is reached. While solid line graph G4 represents the trailer brake signal TBS when temperature LEVEL 1 (WL=1) is reached. Graph G4 shows that the trailer brake signal $p_{C,i}$ can be kept at a constant level (with steps S430 or S835) which may be above pressure limit $p_{TP,max}$ or be reduced with step S446 but if the pressure once drops below pressure limit $p_{TP,max}$, steps 850/860 ensures that the controller pressure $p_{PC,i}$ cannot be increased above the value of the pressure limit $p_{TP,max}$, even if a change in the coupling force may require according step S435. Graph G5 depicts that the limitation is kept even when next interval C start as long as the activation was not aborted. This prohibits increased heat impact by generating an increased trailer brake pressure when temperature LEVEL 1 is reached.

The further steps S465 to S490 remain as described in FIG. 5 and therefore not described further.

To summarize, the method according invention ensures that when temperature LEVEL 2 is reached, the controller pressure $p_{PC,i}$ and thereby the trailer brake signal $p_{TBS}$ is ramped down immediately. As the trailer brake signal is not abruptly cut the driver can easier experience the changing situation assisted by the display warnings.

when temperature LEVEL 1 is present, the method enables to keep trailer brake signal $p_{TBS}$ at the same level or reduce the trailer brake signal $p_{TBS}$ depending on coupling force. Again this avoids abruptly cutting trailer brake signal so that the driver can easier experience the situation assisted by the display warnings.

When temperature LEVEL 1 is present, the method also ensures that the coupling force does not result in a trailer brake signal $p_{TBS}$ which exceeds the pressure limit $p_{TP,max}$ when once below the pressure limit $p_{TP,max}$ This helps to cool the trailer brakes down to a more acceptable level.

When none of the temperature LEVEL 1 or LEVEL 2 condition is present, the trailer brake signal $p_{TBS}$ can be increased or decreased depending on coupling force.

The invention claimed is:

1. A control system for controlling operation of a trailer brake system associated with an agricultural vehicle-trailer combination, the control system being configured to:
   determine a trailer brake temperature;
   compare the determined trailer brake temperature with at least one temperature threshold comprising a first temperature threshold and a second temperature threshold to determine a first temperature level condition (WL=1) for the trailer brake in dependence on the determined trailer brake temperature being between the first temperature threshold and the second temperature threshold, wherein a base temperature level condition (WL=0) corresponds to the determined trailer brake temperature being less than the first temperature threshold;

generate a trailer brake signal for controlling the trailer brake system in dependence on the determined temperature level condition, wherein in dependence on a determination of the trailer brake temperature corresponding to the first temperature level condition (WL=1) the control system is configured to limit the trailer brake signal to a first trailer brake signal limit value corresponding to a pressure limit for the trailer brake system; and forward the trailer brake signal to the trailer brake control system to control operation thereof;

wherein in dependence on a determination of the trailer brake temperature corresponding to the first temperature level condition (WL=1), the control system is configured to prohibit an increase of the trailer brake signal while the trailer brake signal exceeds the first trailer brake signal limit value.

2. The control system of claim 1, wherein in dependence on a determination of the trailer brake temperature corresponding to the first temperature level condition (WL=1), the control system is configured to prohibit the increase of the trailer brake signal to prevent increase of a pressure level associated with the trailer brake system.

3. The control system of claim 1, wherein in a first temperature level condition (WL=1) the control system is configured to limit the trailer brake signal to the first trailer brake signal limit value while the trailer brake signal is below the first trailer brake signal limit value.

4. The control system of claim 1, configured to compare the determined trailer brake temperature with a second temperature threshold, and to determine a second temperature level condition (WL=2) in dependence on the determined trailer brake temperature exceeding the second temperature threshold.

5. The control system of claim 4, wherein in dependence on a determination of the trailer brake temperature corresponding to the second temperature level condition (WL=2), the control system is configured to ramp down the trailer brake signal to reduce a pressure level associated with the trailer brake system.

6. The control system of claim 1, configured to determine a coupling force associated with the coupling between the vehicle and the trailer.

7. The control system of claim 6, configured to determine the coupling force in dependence on a measure of an operating parameter of a transmission of the vehicle-trailer combination.

8. The control system of claim 6, configured to generate the trailer brake signal in dependence on the determined coupling force associated with the coupling between the vehicle and the trailer.

9. The control system of claim 1, configured to generate and output a control signal for providing a warning message to an operator of the vehicle-trailer combination.

10. The control system of claim 9, wherein the warning message is indicative of the determined trailer brake temperature.

11. The control system of claim 9, wherein the warning message is indicative of a determination of a trailer detection.

12. The control system of claim 9, wherein warning message is indicative of a recommendation regarding a vehicle speed reduction.

13. A braking system comprising the control system of claim 1.

14. An agricultural vehicle coupleable to a trailer to form a vehicle-trailer combination, and comprising the control system of claim 1.

* * * * *